(12) United States Patent
Lee et al.

(10) Patent No.: US 9,253,733 B1
(45) Date of Patent: Feb. 2, 2016

(54) PROXIMITY SENSOR ALGORITHMS TO CONTROL TRANSMIT POWER OF A USER DEVICE

(71) Applicant: AMAZON TECHNOLOGIES, INC., Reno, NV (US)

(72) Inventors: Cheng-Jung Lee, San Jose, CA (US); Allen Lee, Los Altos, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/219,992

(22) Filed: Mar. 19, 2014

(51) Int. Cl.
*H01Q 11/12* (2006.01)
*H04W 52/18* (2009.01)

(52) U.S. Cl.
CPC .................................. *H04W 52/18* (2013.01)

(58) Field of Classification Search
CPC ......... G01B 7/02; G06F 17/14; G06F 3/0416; H04B 13/005; H04B 5/0012; H04W 52/226; H04W 52/246; H04W 52/247; H04W 52/248; H04W 52/283; H04W 52/285

USPC ...................................................... 455/127.1
See application file for complete search history.

(56) References Cited

U.S. PATENT DOCUMENTS 8,682,949 B2 * 3/2014 Matsushima ......... G06F 3/0416
708/400

* cited by examiner

*Primary Examiner* — Ajibola Akinyemi
(74) *Attorney, Agent, or Firm* — Lowenstein Sandler LLP

(57) ABSTRACT

Methods and systems are described for determining whether any one of three or more proximity test conditions is met using measurements from a plurality of proximity electrodes located relative to an antenna of a user device and reducing a transmit power level to be used by the antenna when any one of the three or more proximity test conditions is met. A user device obtains measurements from the proximity electrodes, checks the three or more proximity test conditions, and instructs a transmit power manager to reduce a transmit power level to transmit data when any one of the three or more proximity test conditions is met.

20 Claims, 15 Drawing Sheets

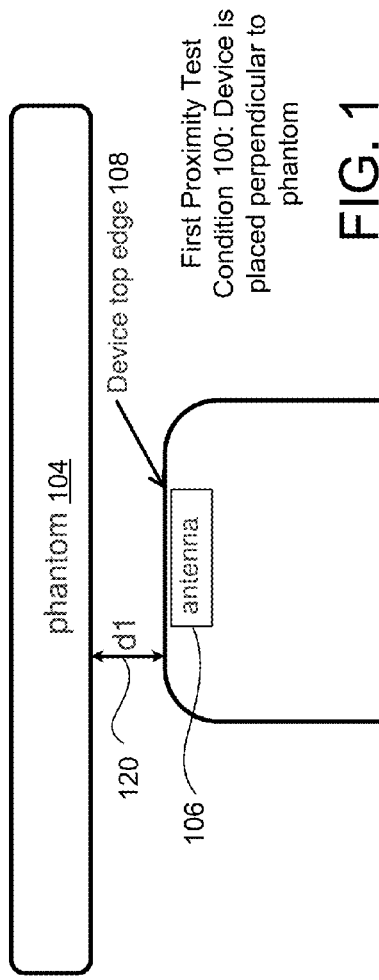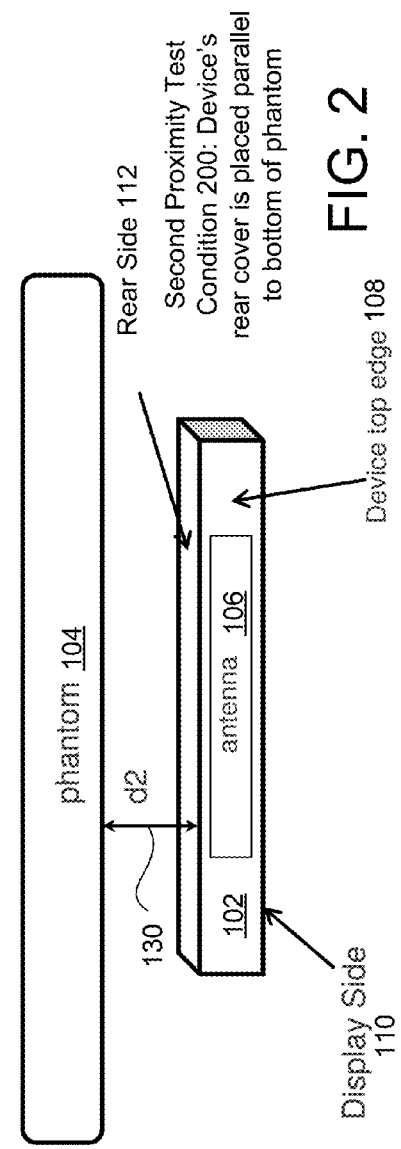

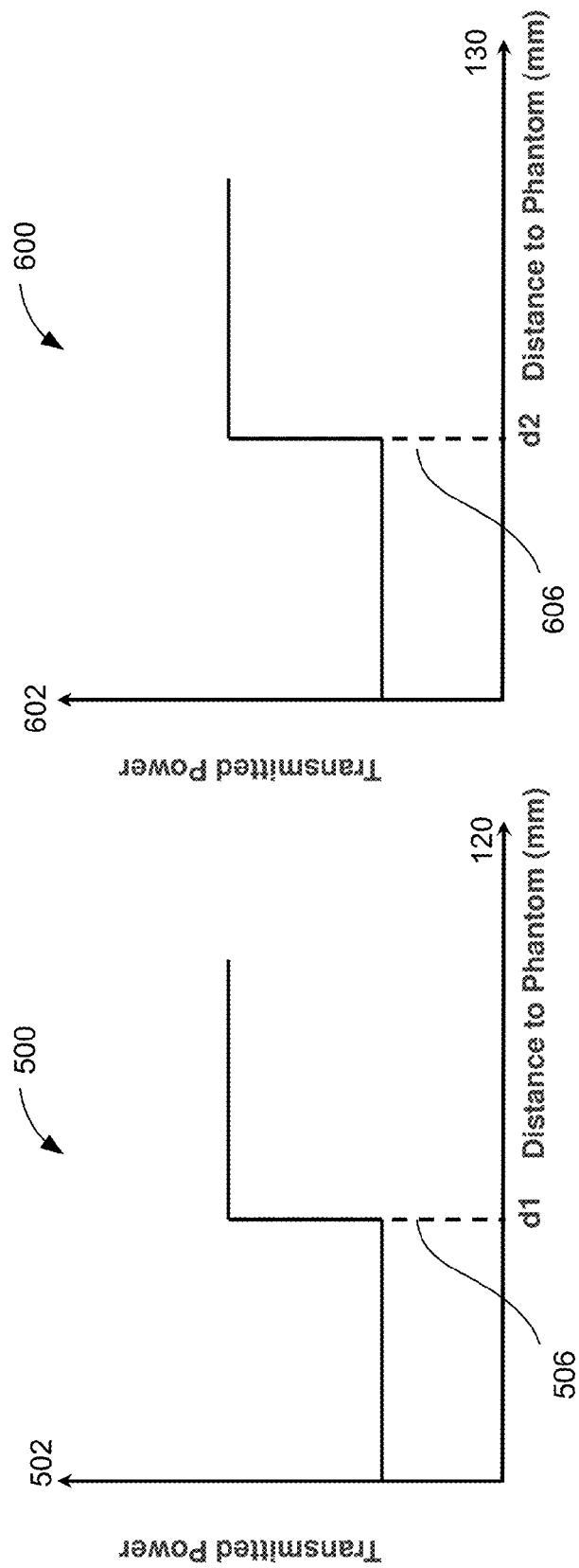

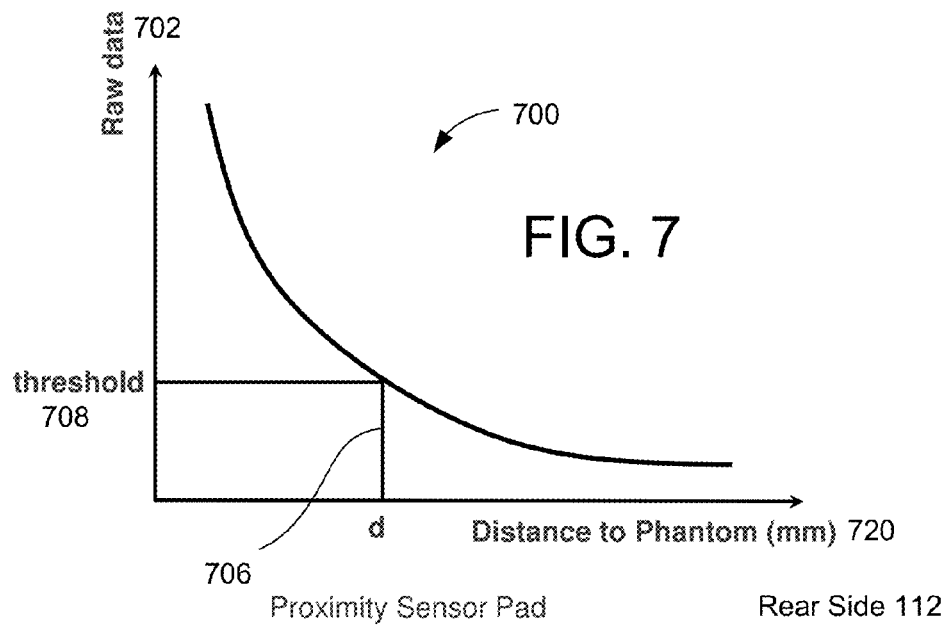
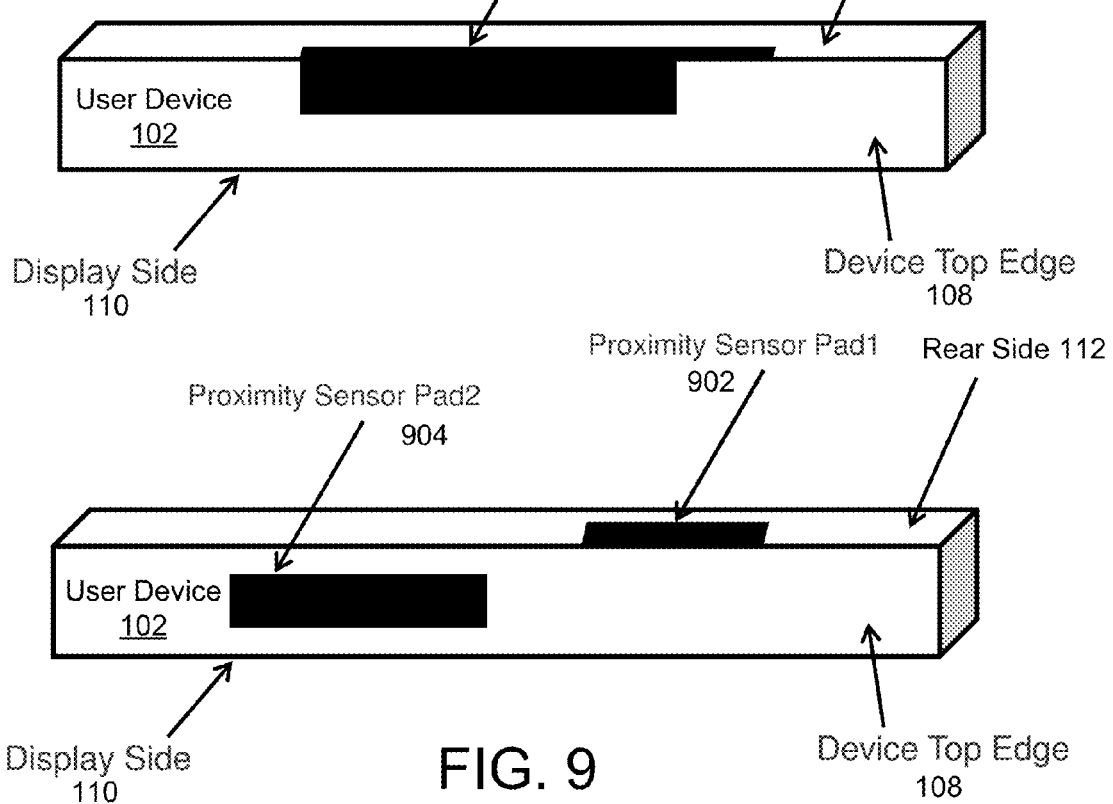

PROXIMITY SENSOR ALGORITHMS TO CONTROL TRANSMIT POWER OF A USER DEVICE

BACKGROUND

A large and growing population of users enjoys entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like. These electronic devices wirelessly communicate with a communications infrastructure to enable the consumption of the digital media items. Typically, the communications infrastructure dictates transmit power levels for the electronic devices to use when transmitting data to the communications infrastructure. Some electronic devices include transmit power managers for making their own determinations regarding what transmit power levels to use.

Some bodies of research suggest that radiation output by electronic devices during wireless transmission of data can cause damage to the human body when such radiation is absorbed. However, since electronic devices lack the ability to control their transmit power levels, such electronic devices cannot adjust their transmit power levels to reduce user exposure to radiation. This may also consequently cause these electronic devices to fail to comply with FCC regulations regarding the specific absorption rate (SAR) permitted by electronic devices. SAR is a measure of the rate at which energy is absorbed by the body when exposed to a radio frequency (RF) electromagnetic field. In addition, the user's body can block the RF electromagnetic field in the direction of the user's body, thus reducing the gain in that direction. This may also cause difficulty in meeting the SAR requirements, since more power is required to offset the signal loss by the user's body.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 1 illustrates a first proximity test condition for SAR compliance according to one implementation.

FIG. 2 illustrates a second proximity test condition for SAR compliance according to one implementation.

FIG. 5 is a graph of a power throttling response for the first proximity test condition according to one implementation.

FIG. 6 is a graph of a power throttling response for the second proximity test condition according to one implementation.

FIG. 7 is a graph of a general response of a single proximity sensor according to one implementation.

FIG. 8 illustrates a single proximity sensor pad on a top edge and a rear side of a user device for multiple SAR test conditions according to one implementation.

FIG. 9 illustrates two proximity sensor pads, one proximity sensor pad on a top edge of a user device and another proximity sensor pad on a rear side of the user device for multiple SAR test conditions according to one implementation.

DETAILED DESCRIPTION

Figure 3:
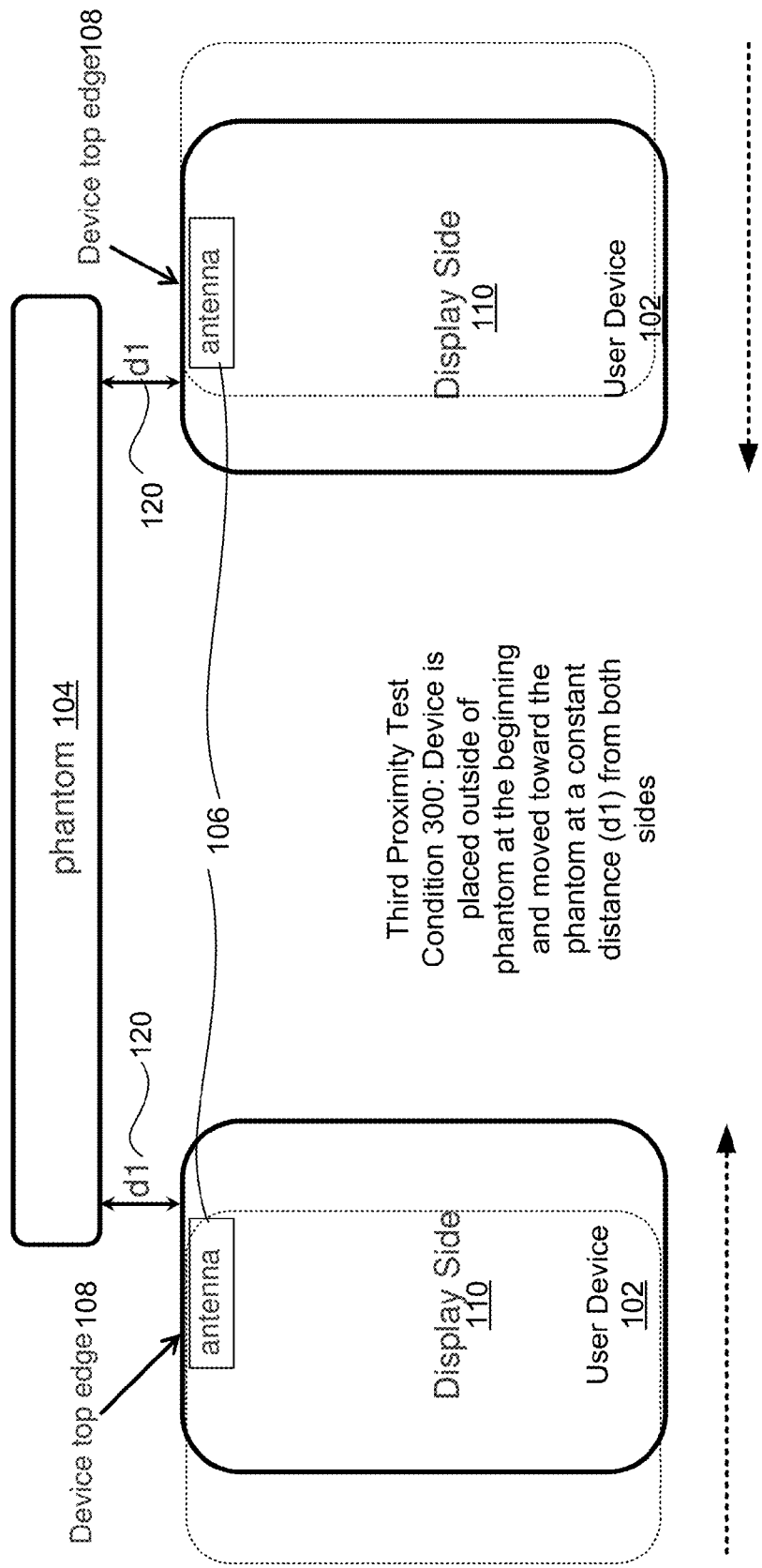
FIG. 3 illustrates a third proximity test condition for SAR compliance according to one implementation.

Methods and systems are described for determining whether any one of three or more proximity test conditions is met using measurements from three or more proximity electrodes located relative to an antenna of a user device and reducing a transmit power level to be used by the antenna when any one of the three or more proximity test conditions are met. A user device obtains measurements from the proximity electrodes, checks the three or more proximity test conditions, and instructs a transmit power manager to reduce the transmit power level to transmit data when any one of the three or more proximity test conditions is met. The embodiments described herein are directed to complying with SAR requirements by decreasing a transmit power of an antenna when any one of the three or more proximity test conditions is met. The user device may be any content rendering device that includes a wireless modem for connecting the user device to a network. Examples of such user devices include electronic book readers, cellular telephones, personal digital assistants (PDAs), portable media players, tablet computers, netbooks, and the like.

As SAR is dependent on the average power transmitted, by reducing the transmit power level when a human body part or a SAR phantom (used during the testing of the user device) (hereinafter referred to as phantom) is detected for the different proximity test conditions, the average transmitted power can be reduced when the user device is in proximity to a person (e.g., a human body part or phantom) or a phantom. The embodiments described herein have the ability to detect when the user device is in proximity to a human body part or phantom for various proximity test conditions and can reduce the transmit power level for SAR compliance. In the consumer electronics world, FCC has a requirement of SAR, such as 1.6 mW/g. For example, if the SAR limit of 1.6 mW/g cannot be met, the transmitted power by the user device needs to be reduced. A proximity sensor can be used to check for three or more proximity test conditions. Once any one of the three or more proximity test conditions is met, a signal can be sent from the proximity sensor to a device system (e.g., a processor) and the device system can lower the transmitted power to meet FCC SAR requirement. FIGS. 1-4 show the proximity test conditions required by FCC. It should be noted that the embodiments described herein can be directed to these proximity test conditions, as well as other conditions for which the transmit power level should be reduced for SAR reduction, as well as for other purposes. The proximity sensor was introduced to detect the proximity of the human body. The proximity sensor is configured to detect proximity in various conditions that would exceed the SAR permitted set by the FCC, if the device was transmitting at maximum power under those various conditions.

FIG. 1 illustrates a first proximity test condition 100 for SAR compliance according to one implementation. The first proximity test condition 100 is where a user device 102 is placed perpendicular to a phantom 104. A proximity sensor (not illustrated in FIG. 1) needs to be triggered when a top edge 108 of the user device 102 reaches a first distance d1 120. When the first distance d1 120 is reached, a transmit power level to be used by the antenna 106 needs to be reduced.

FIG. 2 illustrates a second proximity test condition 200 for SAR compliance according to one implementation. The second proximity test condition 200 is where user device's (102) rear side 112 is in parallel to a bottom of the phantom 104. The proximity sensor (not illustrated in FIG. 2) needs to be triggered when the user device's (102) rear side 112 reaches a second distance d2 130. When the second distance d2 130 is reached, a transmit power level needs to be reduced. Distances d1 120 and d2 130 may not have to be the same and the corresponding reduced power levels may be different.

FIG. 3 illustrates a third proximity test condition 300 for SAR compliance according to one implementation. The third proximity test condition 300 is where the user device 102 is placed outside of the phantom 104 at the beginning of the test, such as to the left of and underneath the phantom 104. The user device's edge is perpendicular to a bottom of the phantom 104. The user device 102 is slowly moved towards the phantom 104 and under the phantom 104 along an axis parallel to the phantom 104 with a first constant distance d1 120 between the user device 102 and the phantom 104. The proximity sensor (not illustrated in FIG. 3) needs to be triggered before a right edge of the antenna 106 overlaps with a left edge of the phantom 104. The user device 102 is again placed outside of the phantom 104, such as to the right of and underneath the phantom 104. The user device 102 is slowly moved towards the phantom 104 and under the phantom 104 along the same axis parallel to the phantom 104 with the same first constant distance d1 120. The proximity sensor needs to be triggered before a left edge of the antenna 106 overlaps with a right edge of the phantom 104. The transmitted power needs to be reduced when the proximity sensor is triggered.

Figure 4:
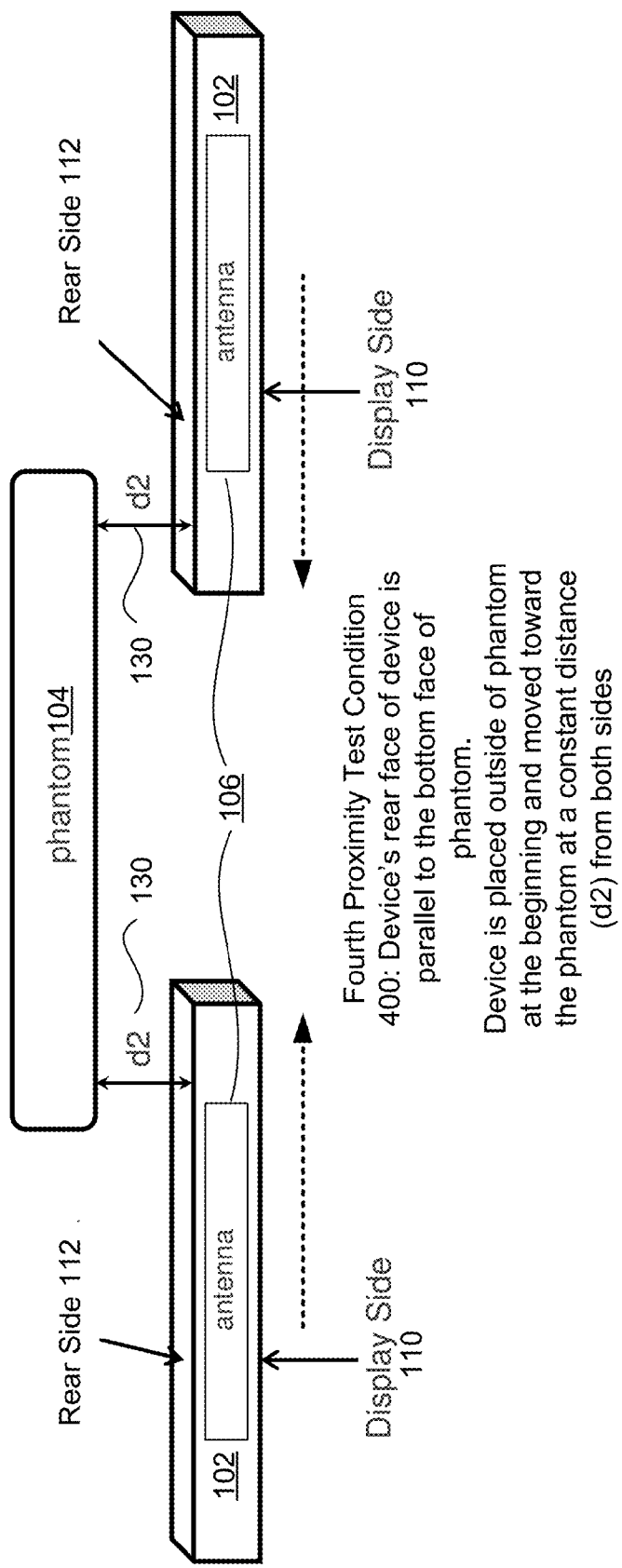
FIG. 4 illustrates a fourth proximity test condition for SAR compliance according to one implementation.

FIG. 4 illustrates a fourth proximity test condition 400 for SAR compliance according to one implementation. The fourth proximity test condition 400 is where the user device 102 is placed outside of the phantom 104 at the beginning of the test, such as to the left of and underneath the phantom 104. The rear side 112 of the user device 102 is parallel to a bottom face of the phantom 104. The user device 102 is slowly moved towards the phantom 104 and under the phantom 104 along an axis parallel to the phantom 104 with a second constant distance d2 130 between the user device 102 and the phantom 104. The proximity sensor needs to be triggered before a right edge of the antenna 106 overlaps with a left edge of the phantom 104. The user device 102 is again placed outside of the phantom 104, such as to the right of and underneath the phantom 104. The user device 102 is then slowly moved towards the phantom 104 and under the phantom 104 along the same axis parallel to the phantom 104 with the same second constant distance d2 130. The proximity sensor needs to be triggered before a left edge of the antenna 106 overlaps with a right edge of the phantom 104. The transmitted power needs to be reduced when the proximity sensor is triggered.

FIG. 5 is a graph 500 of a power throttling response for the first proximity test condition 100 according to one implementation. The graph 500 shows a transmitted power 502 versus distance d1 120 from a user device to a phantom. The triggering distance d 506 is determined by the SAR value specified in the SAR requirement for the first proximity test condition 100.

FIG. 6 is a graph 600 of a power throttling response for the second proximity test condition 200 according to one implementation. The graph 600 shows a transmitted power 602 versus distance d2 130 from a user device to a phantom. The triggering distance d 606 is determined by the SAR value specified in the SAR requirement for the second proximity test condition 200.

FIG. 7 is a graph 700 of a general response of a single proximity sensor according to one implementation. Raw data 702 from the proximity sensor increases as an object (e.g., human body part or phantom) approaches the proximity sensor, i.e., as distance 720 between the proximity sensor pad and phantom decreases. Usually, a threshold 708 can be set for a specific distance 706. Once the threshold 708 is met, the proximity sensor is triggered. It should be noted that this one-to-one mapping function of a single distance to a single threshold makes a design with a single proximity sensor pad difficult to meet multiple proximity test conditions.

FIG. 8 and FIG. 9 show a proximity sensor design concept to meet different proximity test conditions.

FIG. 8 illustrates a single proximity sensor pad 802 on a top edge 108 and a rear side 112 of a user device 102 for multiple proximity test conditions according to one implementation. In FIG. 8, only one proximity sensor chip (integrated circuit) (not illustrated) and one proximity sensor pad 802 is used. The dimensions of a first portion of the proximity sensor pad 802 on the user device top edge 108 may be optimized to meet the first proximity test condition 100 shown in FIG. 1. The dimensions of a second portion of the proximity sensor pad 802 on the user device's rear side 112 may be optimized to meet the second proximity test condition 200 shown in FIG. 2. The third and fourth proximity test conditions 300, 400 in FIGS. 3 and 4 are difficult to meet with this design. In addition, the first portion of the proximity sensor pad 802 on the user device's rear side 112 and the second portion of the proximity sensor pad 802 on the top edge 108 affect each other, thus creating a challenge to setup a proper threshold for both proximity test conditions 300, 400.

FIG. 9 illustrates two proximity sensor pads, one proximity sensor pad 902 on a rear side 112 of a user device 102 and another proximity sensor pad 904 on a top edge 108 of the user device 102 for multiple proximity test conditions according to one implementation. In FIG. 9, two proximity sensor chips (integrated circuits) (not illustrated) and two proximity sensor pads 902, 904 are used. Each proximity sensor pad 902, 904 can be optimized separately based on the respective proximity test condition. However, the proximity test conditions in FIG. 3 and FIG. 4 are also difficult to meet, as described above, and the cost of the design will be doubled.

The embodiments described herein provide an improved design for proximity detection. In one embodiment, a user device includes an antenna and three proximity electrodes (also referred to herein as proximity sensor pads). A first proximity electrode is located adjacent to a first end of the antenna, a second proximity electrode is located at an approximate center location of the antenna and adjacent to a longitudinal side of the antenna and a third proximity electrode is located adjacent to a second end of the antenna. The user device also includes a transceiver to transmit data via the antenna according to a transmit power level. The user device also includes a proximity sensor (integrated circuit) coupled to the transceiver and the proximity electrodes. The proximity sensor is to obtain measurements from the three proximity electrodes and determine whether any one of three or more proximity test conditions is met using the measurements from the three proximity sensor electrodes. The three or more proximity test conditions are defined by different combinations of thresholds as described herein. The different combination of distance thresholds define distances of the object relative to the antenna The proximity sensor instructs the transceiver to reduce the transmit power level to a reduced transmit power level to transmit the data when any one of the three or more proximity test conditions is met. In one embodiment, the four proximity test conditions illustrated in FIGS. 1-4 are checked using the measurements from the three proximity electrodes. For example, one of the conditions may be met when the first measurement exceeds a first threshold and a ratio of the second measurement and the first measurement is less than a third threshold. If any of the proximity test conditions are met, the proximity sensor is in a triggered state and can send a signal to a transceiver or a signal to a processing component that controls the transceiver. The signal can be an input to a transmit power manager executing on the user device. The input can designate a state of the proximity sensor of whether any of the proximity test conditions are met. The signal can be maintained (or the triggered state) until none of the proximity test conditions are met. A new signal, or a state of the signal, can be changed to indicate that the proximity sensor is in an untriggered state when none of the proximity test conditions is met.

Figure 10:
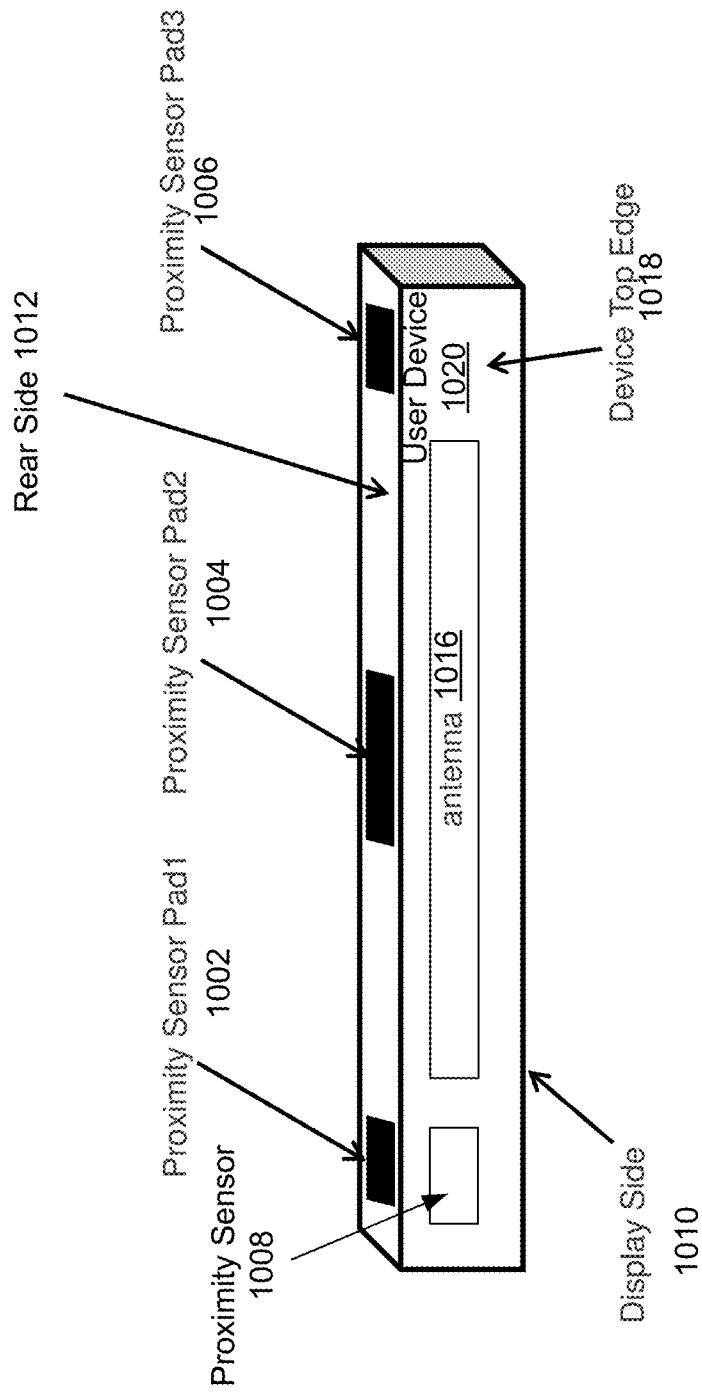
FIG. 10 illustrates three proximity sensor pads disposed on a rear side of a user device according to one embodiment.

FIG. 10 illustrates three proximity sensor pads 1002, 1004, 1006 disposed on a rear side 1012 of a user device 1020 according to one embodiment. The user device 1020 is an example of a proximity sensor design concept where three sensor pads 1002, 1004, 1006 and one proximity sensor chip 1008 is used. The proximity sensor chip 1008 may be an integrated circuit of the user device 1020. In another embodiment, the proximity sensor chip 1008 can be integrated with other circuits of the user device 1020, such as on a circuit board including one or more integrated circuits with various functionality of the user device 1020. For example, a processor can be one integrated circuit mounted on a circuit board and the proximity sensor 1008 can be another integrated circuit mounted on the same circuit board or a different circuit board. The proximity sensor 1008 can send a signal to the processor to indicate that any one of the proximity test conditions is met based on the measurements from the three proximity sensor pads 1002, 1004, 1006. Alternatively, the proximity sensor 1008 can send raw data to the processor and the processor can determine whether any one of the proximity test conditions is met using the techniques described herein. The processor may include a transceiver for the antenna and the processor controls the transmit power level to be used by the antenna. When the proximity sensor 1008 is in a triggered state, the processor reduces a transmit power level via the transceiver. Alternatively, the triggered state can control the reduction of the transmit power level using other mechanisms as would be appreciated.

As described herein, the proximity test conditions illustrated in FIGS. 1-4 can all be checked by the user device 1020. The proximity sensor 1008 can be configured with multiple different combinations of thresholds for the measurements of the three proximity sensor pads 1002, 1004, 1006 to be able to check for the three or more proximity test conditions. The location, shape, dimensions of the three proximity sensor pads can be selected and appropriate multiple thresholds can be set to properly determine whether any one or more of the proximity conditions described herein is met using these measurements. In other embodiments, more than three proximity sensor pads can be used. However, the four proximity conditions illustrated in FIGS. 1-4 can be checked with measurements from the three proximity sensor pads 1002, 1004, 1006.

In the illustrated embodiment, the first proximity sensor pad 1002 is located just beyond a left edge of the antenna 1016 and the third proximity sensor pad 1006 is located just beyond a right edge of the antenna 1016. The second proximity sensor pad 1004 is located at a center location to one side of the antenna 1016. In another embodiment, the second proximity sensor pad 1004 can be located at an off-center location. In these embodiments, the thresholds can be selected to accommodate that the second proximity sensor pad 1004 is located at the off-center location. Alternatively, the second proximity sensor pad 1004 can be located in other locations relative to the antenna 1016. In one embodiment, the three proximity sensor pads 1002, 1004, 1006 are located on a rear side 1012 of the user device 1020 and the antenna 1016 is located on a top edge 1018 of the user device. The rear side 1012 may be a non-display side that is the opposite side of a display side 1010 of the user device 1020. In other embodiments, the three proximity sensor pads 1002, 1004, 1006 and the antenna 1016 are located at other locations, even all on the same side of the user device 1020 as the antenna 1016. As describe herein, the three proximity sensor pads 1002, 1004, 1006 can be disposed in various locations relative to the antenna 1016, such as on a rear side, a top edge side, or both.

Figure 11A:
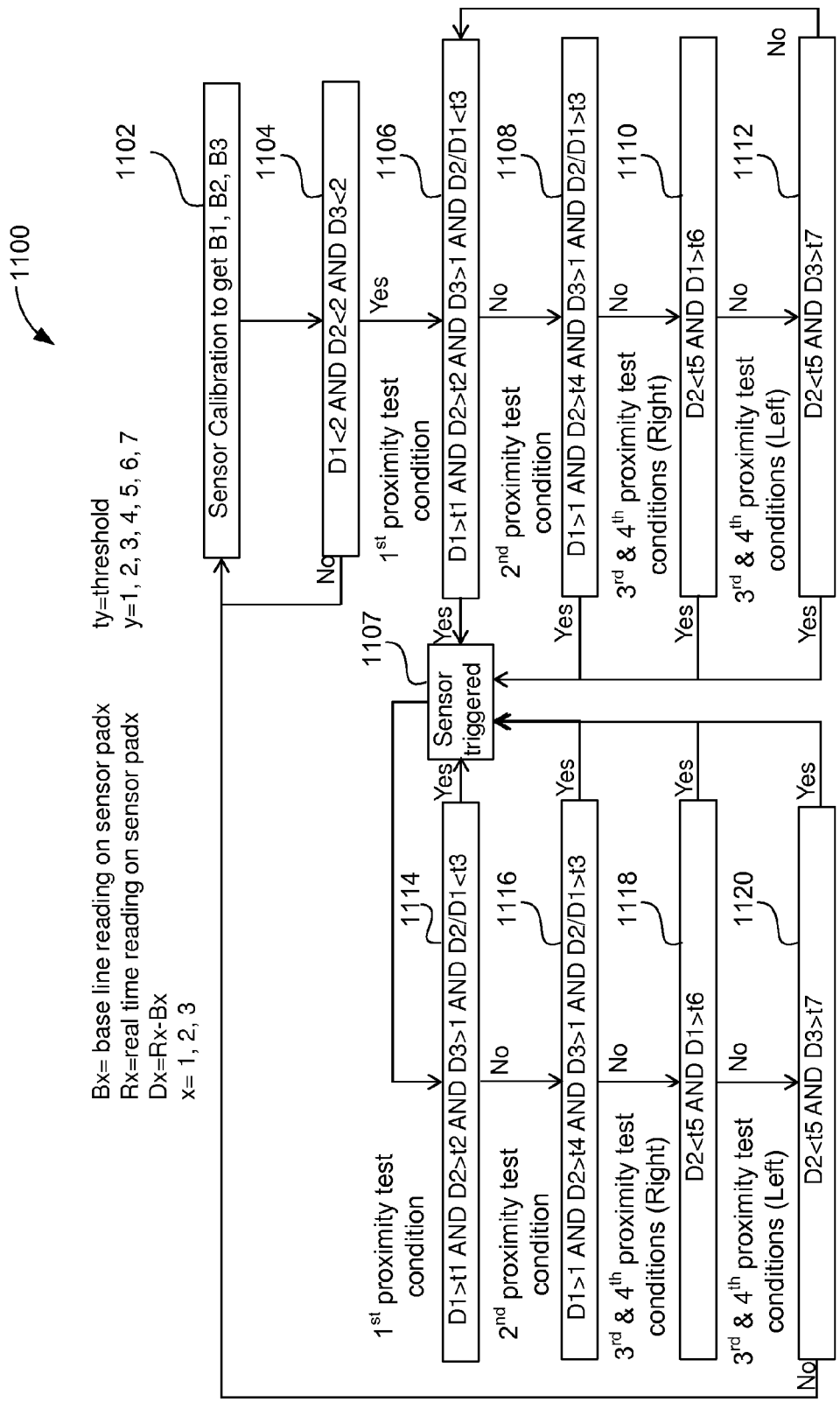
FIG. 11A is a flow diagram of a method for checking four proximity test conditions for transmit power reduction of a user device for SAR compliance according to one embodiment.

FIG. 11A is a flow diagram of a method 1100 for checking three or more proximity test conditions for transmit power reduction of a user device for SAR compliance according to one embodiment. Method 1100 may be performed by processing logic that may comprise hardware (e.g., circuitry, dedicated logic, programmable logic, microcode, etc.), software (such as instructions running on a processor), firmware or a combination thereof. In one embodiment, method 1100 is performed by proximity sensor 1008 of FIG. 10. In another embodiment, the method 1100 is performed by the user device 1205 of FIG. 12, the user device 1300 of FIG. 13. In another embodiment, the method 1100 is performed by the sensor circuitry 1335 of FIG. 13. In another embodiment, the method 1100 is performed by the SAR condition checker 1365 of the transmit power management 1360. Alternatively, other components of a computing system may perform some or all of the operations of the method 1100.

Referring to FIG. 11A, the method 1100 begins by the processing logic performing a sensor calibration to obtain baselines measurements (Bx=B1, B2, B3) (also referred to as baseline readings) for the three proximity sensor pads (x=1, 2, 3) (block 1102). That is pad1=1 is the first proximity sensor pad 1 1002, x=2 is the second proximity sensor pad 2 1004, and x=3 is the third proximity sensor pad 3 1006. For the sensor calibration, the processing logic can obtain current measurements (Rx=R1, R2, R3) (also referred to as real time readings) for the three proximity sensor pads and compare them to the respective baseline measurements (Bx=B1, B2, B3) to obtain a difference count (Dx=D1, D2, D3) to calibrate the proximity sensor for each of the proximity sensor pads. For example, the calibration of the proximity sensor can be adjusted until the count difference (Dx) between the baseline measurements (Bx) and the current measurement (Rx) is within two counts. Once the difference counts (Dx) between the baseline measurements (Bx) and the current measurements (Rx) for the three proximity sensor pads (padx) are within two counts, the calibration is considered complete. Alternatively, other calibration techniques can be used.

At block 1104, the processing logic determines if current measurements (D1, D2, D3) are less than two counts. If so, the processing logic proceeds with testing the four proximity test conditions. At block 1106, the processing logic checks a first proximity test condition, such as illustrated in FIG. 1, is met. In one embodiment, the first proximity test condition is met when: 1) a first measurement D1 (i.e., from the first proximity sensor pad) exceeds a first threshold (t1); 2) a second measurement D2 (i.e., from the second proximity sensor pad) exceeds a second threshold (t2); 3) a ratio of D2 and D1 is less than a third threshold (t3); and 4) a third measurement D3 (i.e., from the third proximity sensor pad) is greater than one. The third measurement D3 being greater than one represents that the third measurement D3 is a "don't care" for the processing logic's determination regarding the first proximity test condition, since any measurement over one would be a significant reading. However, in other embodiments for 4), the third measurement can be any positive value greater than zero, representing a "don't care" input for the processing logic. Similarly, for the first proximity test conditions, the processing logic can ignore the third measurement D3 in determining whether the first proximity test condition is met. Alternatively, the first proximity test condition can be checked using other techniques using the three measurements or more measurements from three or more sensor proximity sensor pads of the user device.

If the first proximity test condition is met at block 1106, the processing logic puts the user device in a sensor triggered state (block 1107). If the first proximity test condition is not met at block 1106, the processing logic proceeds to check whether a second proximity test condition, such as illustrated in FIG. 2, is met.

In one embodiment, the second proximity test condition is met at block 1108 when: 1) the first measurement D1 is greater than one (representing a "don't care" input); 2) the second measurement D2 is greater than a fourth threshold (t4); 3) the third measurement D3 is greater than one (representing a "don't care" input); and 4) the ratio of D2 and D1 is greater than the third threshold (t3). Alternatively, the second proximity test condition can be checked using other techniques using the three measurements or more measurements from three or more sensor proximity sensor pads of the user device.

If the second proximity test condition is met at block 1108, the processing logic puts the user device in the sensor triggered state (block 1107). If the second proximity test condition is not met at block 1108, the processing logic proceeds to check whether a third proximity test condition, such as illustrated in FIG. 3, and a fourth proximity test condition, such as illustrated in FIG. 4, are met at block 1110.

In one embodiment, the third proximity test condition and fourth proximity test condition for a right side are met at block 1110 when: 1) the second measurement D2 is less than a fifth threshold (t5); and 2) the first measurement D1 is greater than a sixth threshold (t6). Alternatively, the third proximity test condition and fourth proximity test condition for the right side can be checked using other techniques using the three measurements or more measurements from three or more sensor proximity sensor pads of the user device.

If the third and fourth proximity test conditions for the right side are met at block 1110, the processing logic puts the user device in the sensor triggered state (block 1107). If the third and fourth proximity test conditions for the right side are not met at block 1110, the processing logic proceeds to check whether third and fourth proximity test conditions for the left side are met at block 1112.

In one embodiment, the third proximity test condition and fourth proximity test condition for a left side are met at block 1112 when: 1) the second measurement D2 is less than the fifth threshold (t5); and 2) the third measurement D3 is greater than a seventh threshold (t7). Alternatively, the third proximity test condition and fourth proximity test condition for the left side can be checked using other techniques using the three measurements or more measurements from three or more sensor proximity sensor pads of the user device.

If the third and fourth proximity test conditions for the left side are not met at block 1112, the processing logic returns to block 1106 to check the first proximity condition.

Once any one of the four proximity conditions is met and the processing logic is at the triggered state at block 1107, the processing logic proceeds to check whether any of the four proximity conditions continue to be met. In particular, at block 1114, the processing logic determines whether the first proximity test condition is met. If the first proximity test condition is still met at block 1114, the proximity sensor remains in the triggered state 1107 and continues checking the first proximity test condition at block 1114 until the first proximity condition is no longer met. When the first proximity test condition is no longer met at block 1114, the processing logic proceeds to determine whether the second proximity test condition is met at block 1116. When the second proximity test condition at block 1116 is no longer met, the processing logic proceeds to block 1118 to determine whether the third proximity test condition and fourth proximity test condition are met for the ride side at block 1118. When the third proximity test condition and fourth proximity test condition at block 1118 are no longer met, the processing logic proceeds to block 1120 to determine whether the third proximity test condition and fourth proximity test condition are met for the left side. When none of the four proximity test conditions are met, the processing logic returns to block 1102 to perform a sensor calibration, and the method 1100 proceeds accordingly. If any of the proximity test conditions are detected at blocks 1114, 1116, 1118, 1120, the processing logic remains in the sensor triggered state 1107. It should also be noted that the method 1100 can be enabled or disabled to operate during specific modes of operation, such as when the user device is in a sensing mode, a transmitting mode, or any combination of modes.

As illustrated in FIG. 11A, the method 1100 defines the triggering conditions of a proximity sensor. Compared to the conventional proximity sensor design where one sensor with one threshold is used to determine the triggered state, the combination of multiple sensor pads and multiple thresholds are utilized to determine the triggered state in this method. This method may provide the advantage of setting different thresholds for different test conditions independently, such as for the four proximity test conditions illustrated in FIGS. 1-4. It should be noted that the method can be modified to include more proximity test conditions than those illustrated and different thresholds can be set for three or more proximity sensor pads.

In another embodiment, the proximity sensor first conducts a self-calibration to get a baseline reading on each proximity sensor pad. The real time sensor reading generated by each proximity sensor pad can be compared to its own baseline reading. Once the difference is within 2 counts for each sensor, the calibration is considered completed. After the self-calibration is finished, the proximity sensor can enter the checking state where four different triggering conditions are examined repeatedly. These four sets of triggering conditions correspond to the four required proximity test conditions shown in FIGS. 1-4. The proximity sensor remains in triggered state if any set of the condition is met. A signal may be sent by the proximity sensor to a module to reduce the transmitted power, such as the transmit power manager described herein. Alternatively, the signal can be sent to other modules in a transceiver, a processor, or other processing component that is used for controlling the transmit power level. Once the triggering condition is met, the proximity sensor may stay triggered until none of the four conditions is satisfied. When proximity sensor switches from triggered state to untriggered state, a new self-calibration can be initiated to get a new baseline reading for each sensor pad. It should be noted that these embodiments may be used in user devices that include multiple antennas and corresponding proximity sensor pads located in relation to the multiple antennas.

The method 1100 introduces two parameters, namely the third threshold t3 and the fifth threshold t5. As described with respect to FIG. 7, the capacitive type of proximity sensor is a one-to-one map function where only one threshold can be set for each sensor pad. Therefore, one threshold is used for multiple directions. For example, if d1 and d2 is different, then the minimum of d1 and d2 are chosen to setup the single threshold. As a result, the triggering distance in one direction will be unnecessarily further than expected. Using the method 1100, the proximity sensor pads can be optimized so that the ratio of D2 and D1 (e.g., D2/D1) is significantly different between the test conditions shown in FIG. 1 and FIG. 2. By using this property, the detection direction can be successfully obtained by the three proximity sensor pads. In addition, in order to cover the additional proximity test conditions shown in FIG. 3 and FIG. 4, two unique thresholds need to be setup properly. In this method, D2 stays at a smaller number in all test setups shown in FIG. 3 and FIG. 4 because the second sensor pad is not directly under the phantom 104. Therefore, the fifth threshold t5 can be chosen properly so another two unique thresholds can be setup separately, sixth threshold t6 for right side and seventh threshold t7 for left side.

Figure 11B:
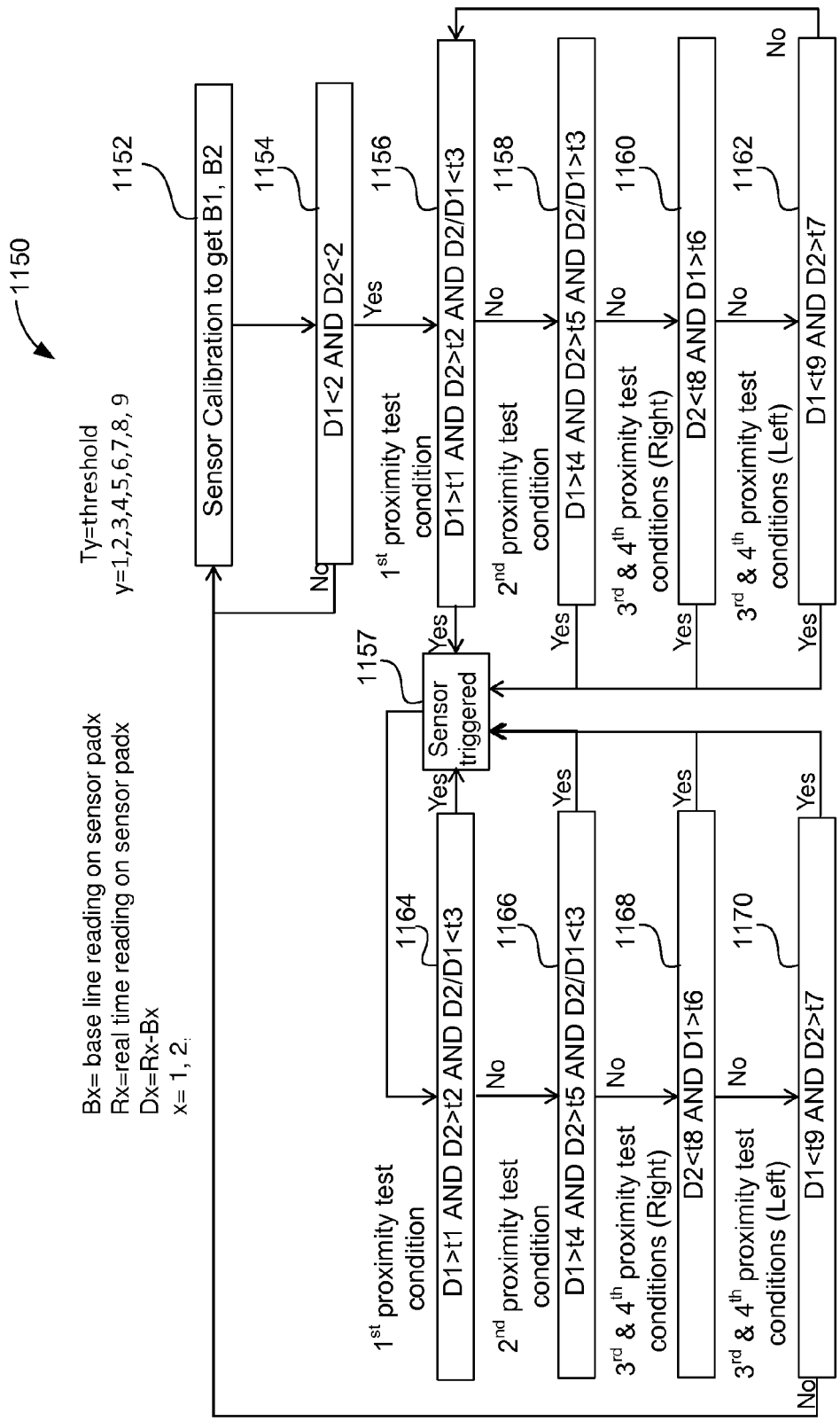
FIG. 11B is a flow diagram of a method for checking four proximity test conditions for transmit power reduction of a user device for SAR compliance according to another embodiment.

FIG. 11B is a flow diagram of a method 1150 for checking four proximity test conditions for transmit power reduction of a user device for SAR compliance according to another embodiment. Method 1150 may be performed by processing logic that may comprise hardware (e.g., circuitry, dedicated logic, programmable logic, microcode, etc.), software (such as instructions running on a processor), firmware or a combination thereof. In one embodiment, method 1150 is performed by proximity sensor 1008 of FIG. 10. In another embodiment, the method 1150 is performed by the user device 1205 of FIG. 12, the user device 1300 of FIG. 13. In another embodiment, the method 1150 is performed by the sensor circuitry 1335 of FIG. 13. In another embodiment, the method 1150 is performed by the SAR condition checker 1365 of the transmit power management 1360. Alternatively, other components of a computing system may perform some or all of the operations of the method 1150.

Referring to FIG. 11B, the method 1150 begins by the processing logic performing a sensor calibration to obtain baselines measurements (Bx=B1 and B2) (also referred to as baseline readings) for the two proximity sensor pads (x=1 and 2) (block 1152). In one embodiment, the pad1=1 is the first proximity sensor pad 1 1002 and x=2 is the third proximity sensor pad 3 1006. For the sensor calibration, the processing logic can obtain current measurements (Rx=R1 and R2) (also referred to as real time readings) for the two proximity sensor pads and compare them to the respective baseline measurements (Bx=B1, B2) to obtain a difference count (Dx=D1, D2) to calibrate the proximity sensor for each of the proximity sensor pads. For example, the calibration of the proximity sensor can be adjusted until the count difference (Dx) between the baseline measurements (Bx) and the current measurement (Rx) is within two counts. Once the difference counts (Dx) between the baseline measurements (Bx) and the current measurements (Rx) for the two proximity sensor pads (padx) are within two counts, the calibration is considered complete. Alternatively, other calibration techniques can be used.

At block 1154, the processing logic determines if current measurements (D1, D2) are less than two counts. If so, the processing logic proceeds with testing the four proximity test conditions. At block 1156, the processing logic checks a first proximity test condition, such as illustrated in FIG. 1, is met. In one embodiment, the first proximity test condition is met when: 1) a first measurement D1 (i.e., from the first proximity sensor pad) exceeds a first threshold (t1); 2) a second measurement D2 (i.e., from the third proximity sensor pad) exceeds a second threshold (t2); and 3) a ratio of D2 and D1 is less than a third threshold (t3). Alternatively, the first proximity test condition can be checked using other techniques using the two measurements or more measurements from two or more sensor proximity sensor pads of the user device.

If the first proximity test condition is met at block 1156, the processing logic puts the user device in a sensor triggered state (block 1157). If the first proximity test condition is not met at block 1156, the processing logic proceeds to determine whether a second proximity test condition, such as illustrated in FIG. 2, is met.

In one embodiment, the second proximity test condition is met at block 1158 when: 1) the first measurement D1 is greater than a fourth threshold (t4); 2) the second measurement D2 is greater than a fourth threshold (t4); and 3) and the ratio of D2 and D1 is greater than the third threshold (t3). Alternatively, the second proximity test condition can be checked using other techniques using the two measurements or more measurements from two or more sensor proximity sensor pads of the user device.

If the second proximity test condition is met at block 1158, the processing logic puts the user device in the sensor triggered state (block 1157). If the second proximity test condition is not met at block 1158, the processing logic proceeds to determine whether a third proximity test condition, such as illustrated in FIG. 3, and a fourth proximity test condition, such as illustrated in FIG. 4, are met at block 1160.

In one embodiment, the third proximity test condition and fourth proximity test condition for a right side are met at block 1160 when: 1) the second measurement D2 is less than an eighth threshold (t8); and 2) the first measurement D1 is greater than a sixth threshold (t6). Alternatively, the third proximity test condition and fourth proximity test condition for the right side can be checked using other techniques using the two measurements or more measurements from two or more sensor proximity sensor pads of the user device.

If the third and fourth proximity test conditions for the right side are met at block 1160, the processing logic puts the user device in the sensor triggered state (block 1157). If the third and fourth proximity test conditions for the right side are not met at block 1160, the processing logic proceeds to determine whether third and fourth proximity test conditions for the left side are met at block 1162.

In one embodiment, the third proximity test condition and fourth proximity test condition for a left side are met at block 1162 when: 1) the first measurement D1 is less than a ninth threshold (t9); and 2) the second measurement D2 is greater than a seventh threshold (t7). Alternatively, the third proximity test condition and fourth proximity test condition for the left side can be checked using other techniques using the two measurements or more measurements from two or more sensor proximity sensor pads of the user device.

If the third and fourth proximity test conditions for the left side are not met at block 1162, the processing logic returns to block 1156 to check the first proximity condition.

Once any one of the four proximity conditions is met and the processing logic is at the triggered state at block 1157, the processing logic proceeds to determine whether any of the four proximity conditions continue to be met. In particular, at block 1164, the processing logic determines whether the first proximity test condition is met. If the first proximity test condition is still met at block 1164, the proximity sensor remains in the triggered state 1157 and continues determining whether the first proximity test condition is still met at block 1164 until the first proximity condition is no longer met. When the first proximity test condition is no longer met at block 1164, the processing logic proceeds to determine whether the second proximity test condition is met at block 1166. When the second proximity test condition at block 1166 is no longer met, the processing logic proceeds to block 1168 to determine whether the third proximity test condition and fourth proximity test condition are met for the ride side at block 1168. When the third proximity test condition and fourth proximity test condition at block 1168 are no longer met, the processing logic proceeds to block 1170 to determine whether the third proximity test condition and fourth proximity test condition are met for the left side. When none of the four proximity test conditions are met, the processing logic returns to block 1152 to perform a sensor calibration, and the method 1150 proceeds accordingly. If any of the proximity test conditions are detected at blocks 1164, 1166, 1168, 1170, the processing logic remains in the sensor triggered state 1157. It should also be noted that the method 1150 can be enabled or disabled to operate during specific modes of operation, such as when the user device is in a sensing mode, a transmitting mode, or any combination of modes.

As illustrated in FIG. 11B, the method 1150 defines the triggering conditions of a proximity sensor. Compared to the conventional proximity sensor design where one sensor with one threshold is used to determine the triggered state, the combination of multiple sensor pads and multiple thresholds are utilized to determine the triggered state in this method. This method may provide the advantage of setting different thresholds for different test conditions independently, such as for the four proximity test conditions illustrated in FIGS. 1-4. It should be noted that the method can be modified to include more proximity test conditions than those illustrated and different thresholds can be set for three or more proximity sensor pads.

In another embodiment, the proximity sensor first conducts a self-calibration to get a baseline reading on each proximity sensor pad. The real time sensor reading generated by each proximity sensor pad can be compared to its own baseline reading. Once the difference is within 2 counts for each sensor, the calibration is considered completed. After the self-calibration is finished, the proximity sensor can enter the checking state where four different triggering conditions are examined repeatedly. These four sets of triggering conditions correspond to the four required proximity test conditions shown in FIGS. 1-4. The proximity sensor remains in triggered state if any set of the condition is met. A signal may be sent by the proximity sensor to a module to reduce the transmitted power, such as the transmit power manager described herein. Alternatively, the signal can be sent to other modules in a transceiver, a processor, or other processing component that is used for controlling the transmit power level. Once the triggering condition is met, the proximity sensor may stay triggered until none of the four conditions is satisfied. When proximity sensor switches from triggered state to untriggered state, a new self-calibration can be initiated to get a new baseline reading for each sensor pad. It should be noted that these embodiments may be used in user devices that include multiple antennas and corresponding proximity sensor pads located in relation to the multiple antennas.

It should be noted that the number of thresholds goes from seven thresholds in method 1100 to nine thresholds in method 1150. The reason is because with the three-electrode design, the processing logic uses the same center electrode threshold for the third and fourth proximity test conditions. Since the third and four proximity test conditions use the measurement from the other proximity sensor pads, there are new thresholds for them (one net extra). In addition, the second proximity test conditions also considers measurements from the two proximity sensor pads, another additional threshold is used, instead of just the measurement from a center proximity sensor pad.

Figure 12:
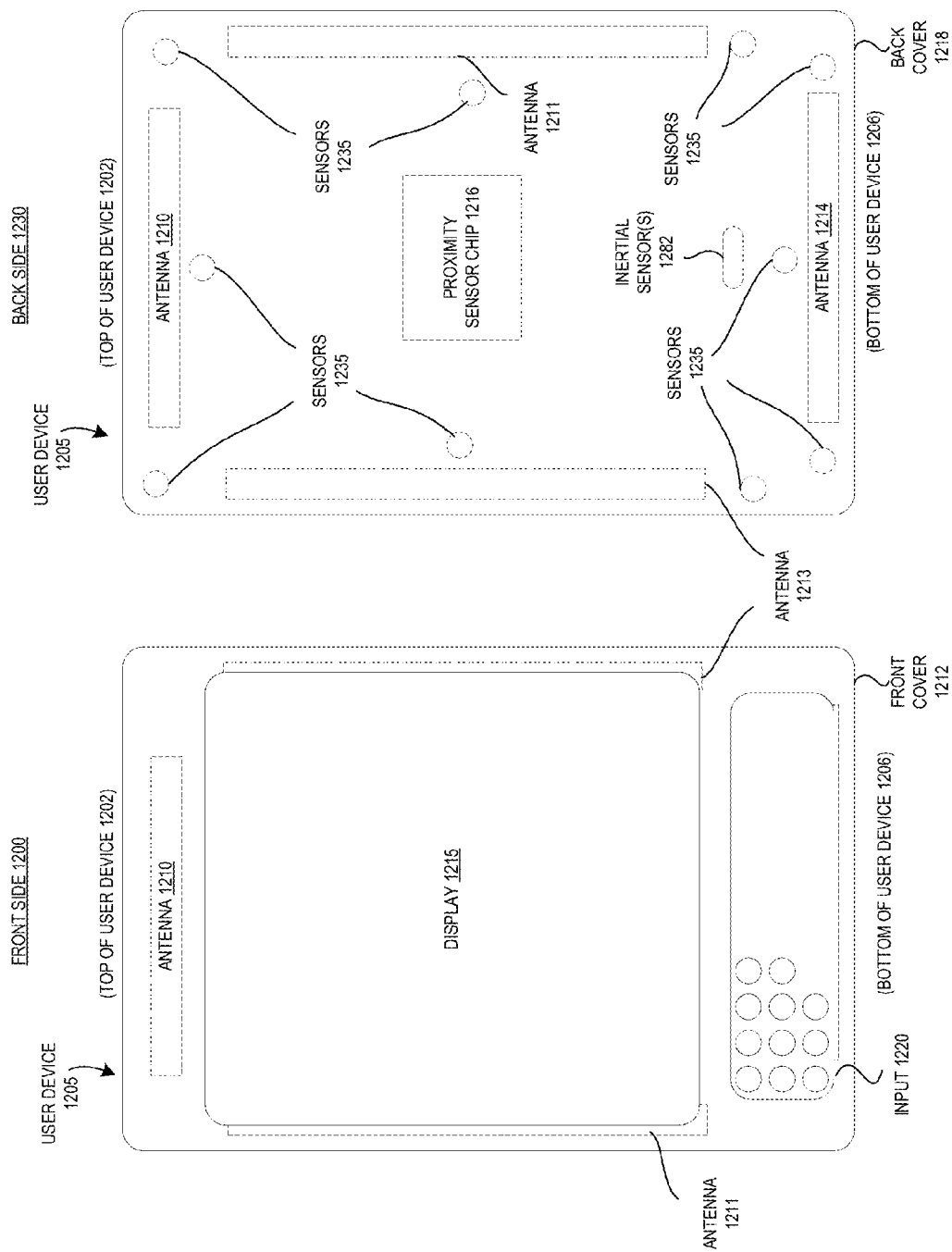
FIG. 12 illustrates an example of a front side and backside of a user device according to one embodiment.

FIG. 12 illustrates an example of a front side 1200 and backside 1230 of a user device 1205. The front side 1200 includes a display 1215 and optionally an input 1220 housed in a front cover 1212. The display 1215 may use any available display technology, such as electronic ink (e-ink), liquid crystal display (LCD), transflective LCD, light emitting diodes (LED), laser phosphor displays (LSP), and so forth. The input 1220 may include a keyboard, touch pad, or other input mechanism. In one embodiment, the display 1215 and input 1220 are combined into one or more touch screens.

Disposed inside the user device 1205 are an antenna 1210, an antenna 1214, three or more sensor electrodes 1235 (e.g., proximity sensor pads), one or more inertial sensors 1282 and a proximity sensor chip 1216. Note that, in some embodiments, the user device 1205 may not include all of the illustrated sensor electrodes 1235, and, in other embodiments, the user device 1205 may not include the inertial sensor(s) 1282. As shown, the antenna 1210 is positioned near a top 1202 of the user device 1205 and the antenna 1214 is positioned near a bottom 1206 of the user device 1205. However, the antennas 1210 and 1214 may also be positioned at other locations, such as at a side of the user device 1205 or near the bottom 1206 of the user device 1205. Alternatively, the user device 1205 may include a single antenna or may include more than two antennas as illustrated in FIG. 12.

Disposed at a backside of the user device 1205 are three or more sensor electrodes 1235. The sensor electrodes 1235 may be electrodes used for proximity sensors such as inductive sensors, capacitive sensors, magnetic sensors, infrared sensors, ultrasonic sensors, or the like. The sensor electrodes 1235 may also be used for touch sensors such as a resistive touch sensor, a capacitive touch sensor, a mechanical touch sensor (e.g., a mechanical button), or the like. FIG. 12 illustrates four sensor electrodes 1235, but more or less sensor electrodes 1235 may be used. Similarly, FIG. 12 illustrates one inertial sensor 1282, but more than one inertial sensor 1282 may be used.

The one or more inertial sensors 1282 may have fixed positions within the user device 1205. The inertial sensors 1282 may include gyroscope and/or accelerometer (e.g., a 3-axis accelerometer). The gyroscope and accelerometer may be separate sensors, or may be combined into a single sensor.

The antenna 1210, antenna 1214, sensor electrodes 1235, and inertial sensors 1282 are shown in the illustrated embodiment using dashed lines to indicate that these components are not on a surface of the user device 1205 (e.g., that they are inside a back cover 1218). However, in alternative embodiments these components may be on a surface of the user device 1205.

Note that in one embodiment the sensor electrodes 1235 are disposed proximate to the antenna 1210 to permit the proximity sensor chip 1216 to detect when a human body part or phantom is close to the antenna 1210 per any one of the proximity test conditions. This may include detecting one or more distances between the antenna 1210 and the human body part or a phantom. The sensor electrodes 1235 may be disposed in an approximately linear pattern as shown in FIG. 12. Alternatively, the sensor electrodes 1235 may be disposed in other patterns at the backside of the user device 1205. Such additional patterns may include a square pattern, an elliptical pattern, a checkerboard pattern, or other pattern. The sensor electrodes 1235 may be discrete sensor pads (as shown), or may be linear sensor arrays, other sensor arrays, a touch panel, slider sensors, or the like. As shown, the sensor electrodes 1235 are disposed between the antenna 1210 and the bottom 1206 of the user device 1205. However, three or more sensor electrodes 1235 may also be disposed at other locations with relation to the antenna 1210, such as between the antenna 1210 and the top 1202 of the user device 1205. Similarly, additional sensor electrodes 1235 may be disposed near the antenna 1214 as illustrated in FIG. 12. Though sensor electrodes 1235 are shown only at the backside 1230 of the user device 1205, the front side 1200 of the user device 1205 may also include other sensor electrodes. When a human body part or phantom is detected near an antenna per the methods 1100 and 1150 described with respect to FIGS. 11A and 11B, the transmit power level for that antenna may be throttled, including reducing the transmit power level for data transmission when any one of the three or more proximity test conditions is met. Alternatively, the transmit power levels for both antennas may be throttled when any one of the three or more proximity test conditions is met.

In one embodiment, the sensor electrodes 1235 may be disposed on an underside of a non-conductive substrate, which may be a rigid substrate (e.g., a printed circuit board (PCB)) or a flexible substrate (e.g., a polyimide film, polyester film, or polyether ether ketone (PEEK) film). When multiple antennas 1210, 1214 are used, sensor electrodes 1235 may be positioned proximate to each antenna 1210, 1220. In some embodiments, one or more sensor electrodes may be used for proximity test conditions for different antennas 1210, 1220. For example, a same sensor electrode can be disposed beyond one end of the antenna 1210 in a position that is also beyond one end of the antenna 1220. Alternatively, when the user device includes a single antenna, the sensor electrode 1235 may be positioned proximate to the single antenna, such as illustrated in FIG. 10. In one embodiment, the sensor electrodes 1235 are located 10 mm from the antenna 1210. Alternatively, the sensor electrodes may be disposed at different locations, and may even be disposed gradually further away from the antenna 1210, such as one sensor electrode at 10 mm, another at 15 mm, another at 20 mm, and another at 25 mm, for example. Depending on which of sensor electrodes the proximity sensor detects the presence of a human body part or phantom and/or relative strengths of detection signals obtained, a distance between the human body part (or phantom) and antenna may be determined. These different sensor electrodes may be used for the different combination of thresholds for checking three or more proximity test conditions.

The sensor electrodes 1235 may also be disposed on inside of the back cover 1218. In other embodiments, the sensor electrodes 1235 may alternatively be positioned within the back cover 1218 such that they are flush with the outer perimeter of the back cover 1218, protrude outside of the back cover 1218, or recede within the back cover 1218. Some sensor electrodes 1235 may also be attached to a front of the non-conductive substrate (e.g., a printed circuit board (PCB)) or to an inside of the front cover 1212. The substrate may be a rigid substrate (e.g. PCB) or a flexible substrate (polyimide, polyester, polyether ether ketone, etc.). The substrate may also have mounted thereon a sensor integrated circuit electrically connected to the sensor electrodes, such as the proximity sensor chip 1216.

In one embodiment, a user's hand or leg may be in contact with the backside 1230 of the user device 1205. During transmission of data, antenna 1210 emits a radio frequency (RF) field that may be absorbed by the portions of the human body (e.g., by the hand and/or leg). The amounts of power/radiation that may be absorbed from the RF field by the portions of the human body are based on a distance of the human body part or phantom. The power of the RF field drops off at a rate of $1/d^2$, where d is distance from the antenna 1210. Accordingly, the closer a human body part or phantom is to the antenna 1210, the more radiation that may be absorbed. The different body parts may absorb different amounts of radiation, and the sensor electrodes 1235 may be used to determine which antenna needs to be reduced per the proximity test conditions. For example, the leg may only absorb a nominal amount of radiation from the RF field because of the distance between the antenna 1210 and the leg. However, the hand may be close enough to the antenna 1210 to possibly absorb elevated amounts of radiation. In this case, if the hand were positioned over one of sensor electrodes 1235, the sensor proximity sensor chip 1216 detects the presence of the hand or phantom. In some embodiments, depending on the sensor type, the proximity sensor chip 1216 may detect the presence of a human body part or phantom even if the human body part or phantom is not in direct contact with the sensor electrode 1235 or not positioned directly over the sensor electrode 1235. For example, capacitive sensors, inductive sensors, optical sensors, ultrasonic sensors, and the like may detect objects that are proximate to, but not touching, the sensor electrodes. If sensor electrodes 1235 are positioned across the entire backside 1230 (e.g., in a sensor array), then signals from multiple sensor electrodes can be processed to visualize a size, shape and/or position of a detected object. This may enable the user device 1205 to identify whether a detected object is a human body part or phantom, as well as a distance between the human body part or phantom and the antenna 1210.

Upon detection of the hand, the user device 1205 may throttle an output power level used to transmit data via the antenna 1210, may restrict transmission of data entirely, or may reduce a number of scheduled requests used for data transmission. Such throttling or restriction may remain in place until the hand is no longer detected, at which time normal output power levels may be used for the transmission of data. Various embodiments of power throttling may be used.

Figure 13:
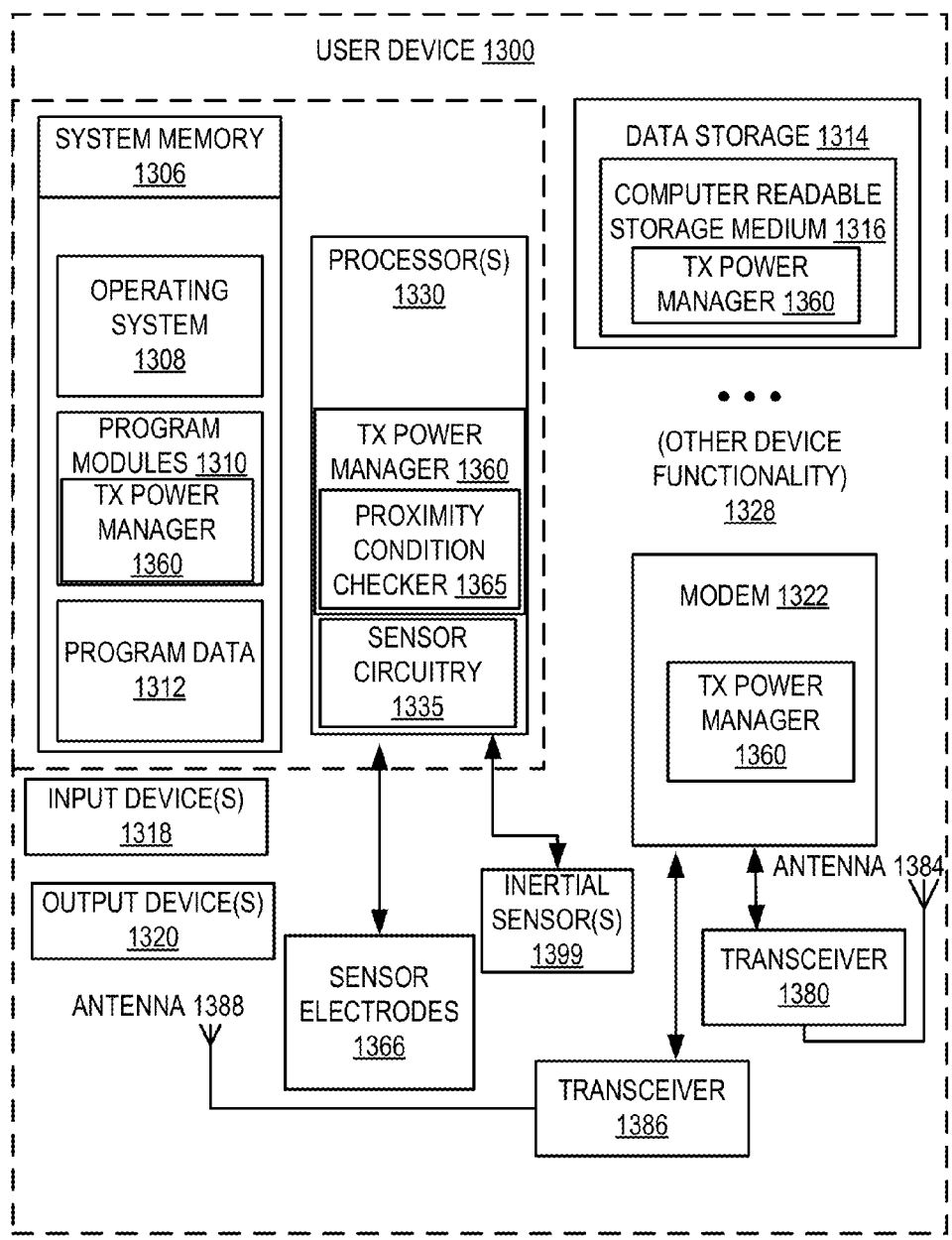
FIG. 13 is a block diagram illustrating one embodiment of an exemplary user device.

FIG. 13 is a block diagram illustrating an exemplary user device 1300. The user device 1300 may correspond to the user device 1020 of FIG. 10, user device 1205 of FIG. 12, user device 1405 of FIG. 14, or the user device of FIG. 15 and may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like.

The user device 1300 includes one or more processors 1330, such as one or more CPUs, microcontrollers, field programmable gate arrays, or other types of processors. The user device 1300 also includes system memory 1306, which may correspond to any combination of volatile and/or non-volatile storage mechanisms. The system memory 1306 stores information that provides an operating system component 1308, various program modules 1310 such as transmit (TX) power manager 1360, including a SAR condition, program data 1312, and/or other components. The user device 1300 performs functions by using the processor(s) 1330 to execute instructions provided by the system memory 1306.

The user device 1300 also includes a data storage device 1314 that may be composed of one or more types of removable storage and/or one or more types of non-removable storage. The data storage device 1314 includes a computer-readable storage medium 1316 on which is stored one or more sets of instructions embodying any one or more of the methodologies or functions described herein. As shown, instructions for the transmit power manager 1360 may reside, completely or at least partially, within the computer readable storage medium 1316, system memory 1306 and/or within the processor(s) 1330 during execution thereof by the user device 1300, the system memory 1306 and the processor(s) 1330 also constituting computer-readable media. The user device 1300 may also include one or more input devices 1318 (keyboard, mouse device, specialized selection keys, etc.) and one or more output devices 1320 (displays, printers, audio output mechanisms, etc.).

The user device 1300 further includes a wireless modem 1322 to allow the user device 1300 to communicate via a wireless network (e.g., such as provided by the wireless communication system) with other computing devices, such as remote computers, an item providing system, and so forth. The wireless modem 1322 allows the user device 1300 to handle both voice and non-voice communications (such as communications for text messages, multimedia messages, media downloads, web browsing, etc.) with a wireless communication system (e.g., 1410 or 1412 of FIG. 14). The wireless modem 1322 may provide network connectivity using any type of mobile network technology including, for example, cellular digital packet data (CDPD), general packet radio service (GPRS), EDGE, universal mobile telecommunications system (UMTS), 1 times radio transmission technology (1xRTT), evaluation data optimized (EVDO), high-speed down-link packet access (HSDPA), Wi-Fi, Long Term Evolution (LTE) and LTE Advanced (sometimes generally referred to as 4G), etc. In one embodiment, the wireless modem includes the transmit power manager 1360 in addition to, or instead of, the transmit power manager 1360 being included in the computer readable storage medium 1316, system memory 1306 and/or processor(s) 1330. The transmit power manager 1360 may be implemented as hardware, firmware and/or software of the wireless modem 1322. It should be noted that the modem 1322 may include a processing component that performs various operations to handle both voice and non-voice communications. This processing component can execute the transmit power manager 1360. Alternatively, the transmit power manager 1360 can be executed by a processing component of the user device, such as the processor 1330 or other types of processing device. In one embodiment, the processor 1330 includes a TX power manager circuit that includes sensor circuitry 1335 to obtain the measurements from the three or more sensor electrodes 1366 and the functionality of the proximity condition checker 1365 to check the proximity test conditions for power throttling.

The wireless modem 1322 may generate signals and send these signals to power transceiver 1380 or transceiver 1386 for amplification, after which they are wirelessly transmitted via antenna 1384 or antenna 1388, respectively. Antenna 1384 and 1388 may be configured to transmit in different frequency bands and/or using different wireless communication protocols. The antennas 1384, 1388 may be directional, omnidirectional, or non-directional antennas. In addition to sending data, antennas 1384, 1388 also receive data, which is sent to wireless modem 1322 and transferred to processor(s) 1330. The transmit power manager 1360 can instruct the transceiver 1380, 1386 to reduce transmit power levels to be used by the antenna 1334, 1388, respectively.

Though a single modem 1322 is shown to control transmission to both antennas 1384 and 1388, the user device 1300 may alternatively include multiple wireless modems, each of which is configured to transmit data via a different antenna and/or wireless transmission protocol. In one embodiment, each modem includes an independent transmit power manager. Alternatively, a single transmit power manager (e.g., that is included in system memory 1306, processor 1330 and/or data storage 1314) may control transmit power levels used by each wireless modem. In addition, the user device 1300, while illustrated with two antennas 1384, 1388, may include more or fewer antennas in various embodiments.

In one embodiment, user device 1300 includes sensor circuitry 1335 (e.g., a proximity sensor chip) that measures signals on the three or more sensor electrodes 1366. The sensor circuitry 1335 can be a physical contact sensor or a close proximity sensor. The sensor circuitry 1335 can detect the presence of human body parts or phantoms, as well as check the proximity test conditions as described herein, and convey information regarding the detected presence and the proximity test conditions to processor(s) 1330. In another embodiment, a proximity sensor chip can be separate from the processor 1330 and the proximity sensor can perform the proximity test conditions checks and convey this information to the processor 1330. In another embodiment, the functionality of a proximity sensor chip is implemented in the processor 1330 or on a same IC as a processing component that executes the transmit power manager 1360, such as a modem 1322. In one embodiment, the sensor electrodes 1366 may be capacitive sensor electrodes that are coupled to sensor circuitry 1335 to measure capacitance generated by the presence of the human body part or phantom using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors may also be optical (e.g., infrared) sensors that use an emitter and receiver pair to detect the presence of opaque objects. Alternatively, the sensors may be inductive sensors, which include an inductive loop. When the presence of a human body part (or metal object) or phantom is brought close to the inductive sensor element, an induction of the inductive loop changes, causing the human body part or phantom to be detected. Alternatively, the sensors may be ultrasonic sensors that emit an ultrasonic signal and measure a time duration between when a signal is transmitted and the reflection of that signal received (a.k.a., flight response). The sensors may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part or phantom, other types of objects may also be detected depending on the sensing technologies used.

In one embodiment, user device 1300 includes one or more inertial sensor electrodes 1399. The inertial sensor electrodes 1399 can be used to detect motion of the user device 1300. In one embodiment, the inertial sensor electrodes 1399 detect linear accelerations (translational movement) and angular accelerations (rotational movement). The inertial sensor electrodes 1399 may include accelerometers and/or gyroscopes. Gyroscopes use principals of angular momentum to detect changes in orientation (e.g., changes in pitch, roll, and twist). Accelerometers measure accelerations along one or more axes (e.g., translational changes). The gyroscope and accelerometer may be separate sensor electrodes, or may be combined into a single sensor. The inertial sensor electrodes 1399 in one embodiment are micro-electromechanical systems (MEMS) sensor electrodes. The data from the inertial sensor electrodes 1399 can be used to supplement the measurements from the proximity sensor electrodes 1366 or to confirm the proximity test conditions.

The processor(s) 1330 may include sensor circuitry 1335 (e.g., sensor device drivers) that enables the processor(s) 1330 to interpret signals received from the sensor electrodes 1366 and/or inertial sensor electrodes 1399. In one embodiment, the inertial sensors 1399 output fully processed signals to the processor(s) 1330. Similarly, a proximity sensor that is separate from the processor 1330 can output fully processed signals to the processor 1330 or state signals, such as a triggered state signal, an untriggered state signal, or a state signal with a triggered state or an untriggered state. For example, the proximity sensor may also output a distance, a detected/not detected signal, etc. using a single line interface or a multi-line interface. Similarly, inertial sensors 1399 may output an acceleration value (e.g., in Gs). In another embodiment, the proximity sensor outputs, for example, positional data and/or object presence data (e.g., of a human body part or phantom) to the processors 1330 without first processing the data. Similarly, inertial sensors 1399 may output, for example, voltage values that can be interpreted as acceleration values. In either instance, the processors 1330 may use the sensor circuitry 1335 to process and/or interpret the received data or to measure signals on the sensor electrodes 1366 directly. If data is received from multiple sensors electrodes 1366 and/or inertial sensors 1399, processing the signal may include averaging, identifying a maximum, or other measurements from the multiple sensor electrodes. In one embodiment, in which the sensors electrodes 1366 are arranged in a sensor array, numerous sensors, or a touch panel, processing the data may include determining where on the user device the human body part or phantom is located from multiple sensor readings.

Figure 14:
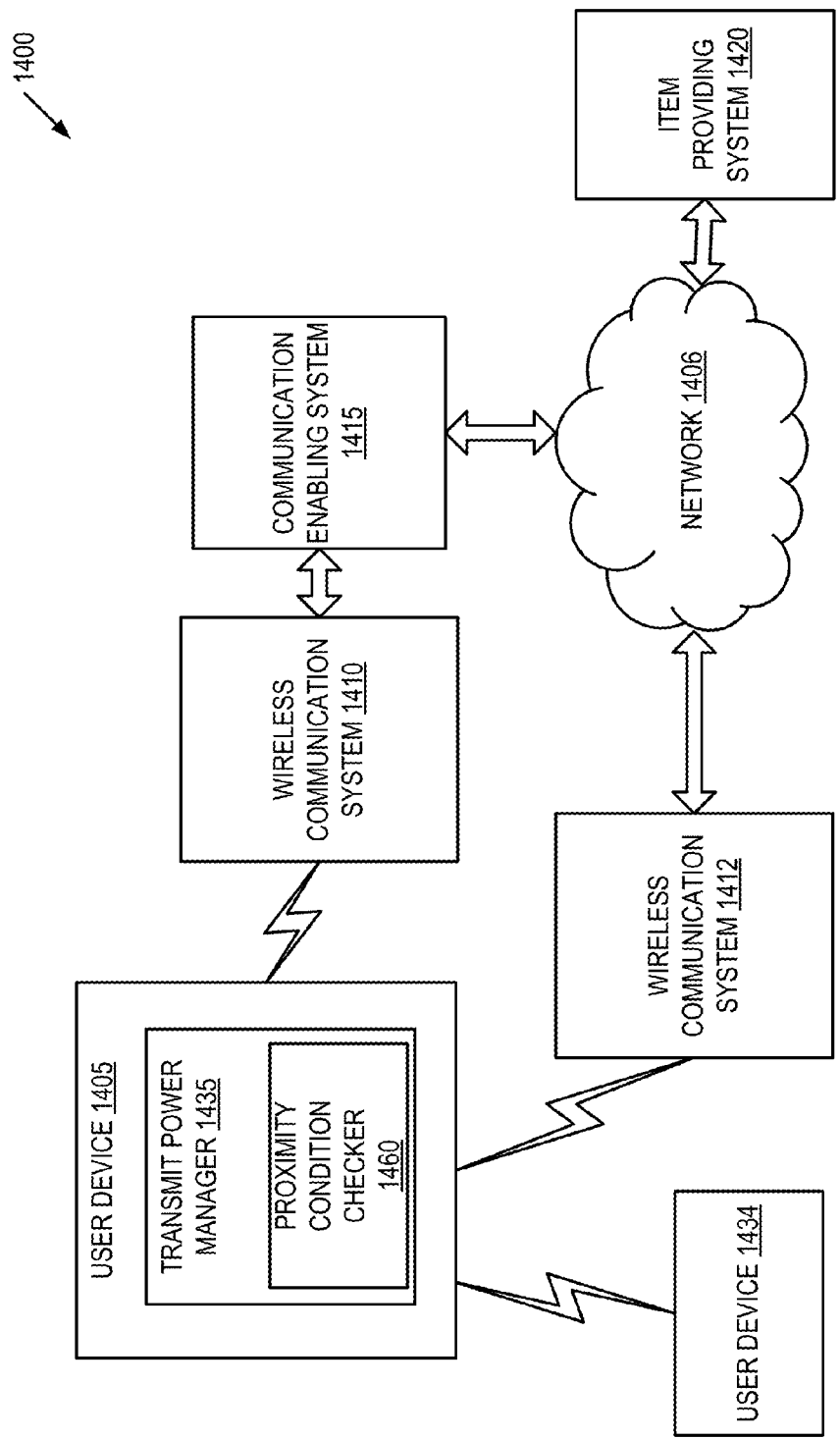
FIG. 14 is a block diagram of an exemplary network architecture in which embodiments of a transmit power manager and a proximity test condition checker may operate.

FIG. 14 is a block diagram of an exemplary network architecture 1400 in which embodiments of a transmit power manager 1435 and a proximity test condition checker 1460 may operate. The network architecture 1400 may include an item providing system 1420 and one or more user devices 1405 capable of communicating with the item providing system 1420 via a network 1406 (e.g., public network such as the Internet or private network such as a local area network (LAN)).

The user devices 1405 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1405 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 1420 and the user devices 1405 deliver and/or receive items, upgrades, and/or other information via the network 1406. For example, the user devices 1405 may download or receive items from the item providing system 1420. The item providing system 1420 also receives various requests, instructions and other data from the user devices 1405 via the network 1406. The item providing system 1420 may include one or more machines (e.g., one or more server computer systems, routers, gateways, etc.) that have processing and storage capabilities to provide the above functionality.

Communication between the item providing system 1420 and the user device 1405 may be enabled via any communication infrastructure. One example of such an infrastructure includes a combination of a wide area network (WAN) and wireless infrastructure, which allows a user to use the user device 1405 to purchase items and consume items without being tethered to the item providing system 1420 via hardwired links. The wireless infrastructure may be provided by one or multiple wireless communications systems, such as wireless communications system 1410 and wireless communication system 1412. One of the wireless communication systems 1410, 1412 may be a wireless fidelity (Wi-Fi) hotspot connected with the network 1406. Another of the wireless communication systems 1410, 1412 may be a wireless carrier system that can be implemented using various data processing equipment, communication towers, etc. Alternatively, or in addition, the wireless carrier system may rely on satellite technology to exchange information with the user device 1405.

The communication infrastructure may also include a communication-enabling system 1415 that serves as an intermediary in passing information between the item providing system 1420 and the wireless communication system 1410. The communication-enabling system 1415 may communicate with the wireless communication system 1410 (e.g., a wireless carrier) via a dedicated channel, and may communicate with the item providing system 1420 via a non-dedicated communication mechanism, e.g., a public Wide Area Network (WAN) such as the Internet.

In one embodiment, while the user device 1405 is connected with the wireless communication system 1410 and/or wireless communication system 1412, one or both of the wireless communication systems periodically or continuously specifies transmit power levels for the user device 1405 to use for transmissions to that wireless communication system 1410, 1412. For example, conventional wireless carrier systems dictate what transmit power levels mobile phones are to use for communications with the wireless carrier systems. The transmit power levels that the wireless carrier systems specify continuously vary based on environmental factors such as a current signal to noise ratio, distance between the mobile phone and a nearest cell tower, obstacles between the mobile phone and the nearest cell tower, and so on. Conventionally, wireless communication systems consider only signal strength when specifying what transmit power levels the user device is to use in transmissions of data. The user device 1405 does take into consideration radiation emitted by the user device 1405 that may be absorbed by users of the user device 1405, interference with other wireless connections, battery life of the user device 1405, or other factors that may also be important to a user when specifying transmit power levels. Additionally, the user device 1405 may have additional information that is not available to the wireless communication systems 1410, 1412. This additional information may be used to help determine what transmit power levels should be used. For example, the additional information may be whether the user device is in proximity with a human body part or phantom or whether any one of the three or more proximity conditions is met, and reduce the power accordingly.

In one embodiment, the user device 1405 includes a transmit power manager 1435 that receives a specified transmit power level from the wireless communication system 1410 in response to the declared power level by the user device. The transmit power manager 1435 can transmit information at the specified transmit power level or at a reduced transmit power level as described herein. The transmit power manager 1435 can also perform its own analysis to determine what transmit power levels should be used for the transmission of data to the wireless communication system 1410. For example, the wireless communication system 1410 may send a command that the user device is to transmit at a maximum transmit power level, and the transmit power manager 1435 instructs the modem when data can be transmitted. During normal operation, the transmit power manager 1435 can transmit the data at the maximum transmit power level. When user device 1405 detects the presence of a human body part or phantom that meets any one of the three or more proximity test conditions, and, in response, the transmit power manager 1435 can reduce the specified transmit power level to a reduced transmit power level for transmission of the data.

In addition to wirelessly connecting to a wireless communication system 1410, 1412, the user device 1405 may also wirelessly connect with other user devices (e.g., user device 1405). For example, user device 1405 may form a wireless ad hoc (peer-to-peer) network with user device 1405. In addition to controlling the transmit power levels used to communicate with the wireless communication systems 1410, 1412, the transmit power manager 1435 may also control the transmit power used to communicate with other user devices 1434.

Figure 15:
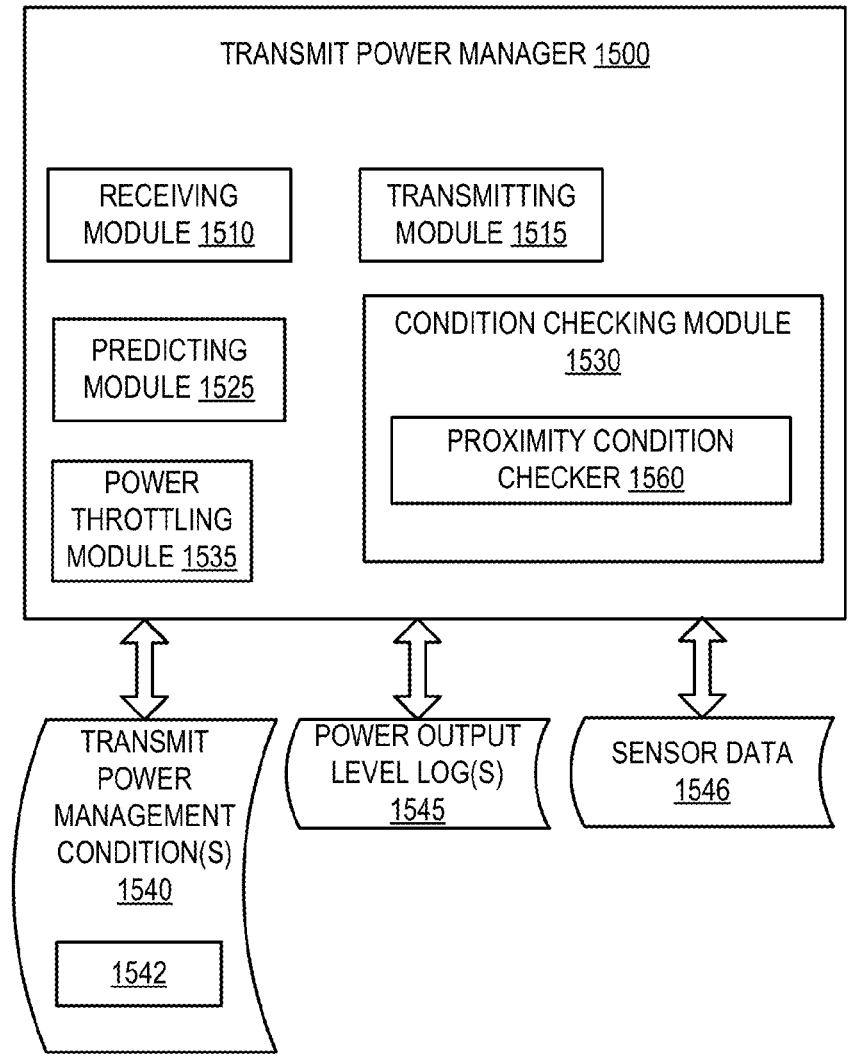
FIG. 15 is a block diagram of one embodiment of a transmit power manager.

FIG. 15 is a block diagram of one embodiment of a transmit power manager 1500, which may correspond to the transmit power manager 1435 of FIG. 14. In one embodiment, the transmit power manager 1500 includes a receiving module 1510, a transmitting module 1515, a predicting module 1525, a condition checking module 1530 that includes a proximity condition checker 1560, which may correspond to the proximity condition checker 1460 of FIG. 14, and a power throttling module 1535. Like the proximity condition checker 1460, the proximity condition checker 1560 can be used to reduce a transmit power level when any one of the three or more proximity test conditions is met as described herein. The receiving module 1510 receives commands to transmit data. The commands to transmit data may identify the specified transmit power level to use for data transmission, for example, the commands may specify that a transmit power level of +33 dbm is to be used), or may specify a current transmit power level as a change from a previously used transmit power level (e.g., an increase of 1 dbm or a decrease of 2 dbm). Commands may also indicate that a previously specified transmit power level should be used. Commands may originate from the wireless communication system, and may be routed to the transmit power manager 1500 by a wireless modem and/or processor of the user device. These commands may also be received from other sources, such as applications running on the user device.

Condition checking module 1530 determines whether any transmit power management conditions 1540 apply to transmissions that are to be made. The transmit power management conditions 1540 may include safety conditions, communications interference conditions, battery level conditions, power consumption conditions, and so on. The transmit power management conditions 1540 may apply to communications via a particular wireless communication protocol, with a particular wireless communication system, associated with a particular application, etc. Some transmit power management conditions 1640 may apply to multiple wireless protocols, wireless communications systems, applications, etc. For those transmit power management conditions 1540 that apply to a current transmission, condition checking module 1530 determines whether the conditions will be violated by the current transmission. For example, condition checking module 1530 may determine whether transmit power management conditions will be violated by transmitting data at the specified transmit power level. As describe herein, the proximity condition checker 1560 can be used to detect whether any one of the proximity test conditions described herein is met to put the user device in a triggered state.

In another embodiment, the transmit power management conditions 1540 include a human body part (or phantom) proximity condition. In another embodiment, the transmit power management conditions 1540 include proximity test conditions 1542 that specify the different combination of thresholds needed to test for multiple proximity test conditions as described herein. This condition may be violated (or alternatively satisfied) when a human body part or phantom is detected (e.g., when a user is holding the user device), or when a user device determines that a human body part or phantom is closer than a predetermined distance from an antenna of the user device per any of the proximity test conditions. In one embodiment, the human body part proximity condition may be determined based on the sensor data 1546. In another embodiment, the transmit management conditions 1540 may include a user interaction condition indicative that a user is currently using the user device to infer that a human body part or phantom is touching or in close proximity to the user device. In one embodiment, the human body part proximity condition or the user interaction condition may be computed by the processor (or other component) and provided as one of the transmit power management conditions 1540 to the transmit power manager 1540. Alternatively, the transmit power manager 1500 may use the sensor data 1546, or other user input data, to determine the human body part proximity condition or the user interaction condition based on the data.

The power management conditions 1540, including the proximity test conditions 1542, may include other conditions, such as maximum accumulated transmit power level condition that can be used separately or in combination with some of the other conditions to determine if the condition is violated, and to take appropriate action based on the violation. Another example is a communications interference condition for when there are two or more concurrent connections with different wireless communication system and/or user device. Another example is an active application condition that can be satisfied when a particular application (e.g., an ad hoc network application) is running on the user device or when a particular operation of a specified application is to be performed (e.g., a file transfer operation). Another example is a security condition, such as a maximum transmit distance condition, which may be satisfied when certain applications are active, when certain operations are being performed and/or when certain types of wireless connections are established. The maximum transmit distance condition may cause a transmit power level to be reduced to a level just powerful enough to transmit to nearby devices (e.g., to devices within a range of 6 feet from the user device) in order to increase transmission security by preventing devices outside of a maximum distance from receiving transmissions.

The transmit power management conditions 1540 may be stored in volatile or nonvolatile memory of the user device 102. In one embodiment, the power management conditions 1540 are hard coded into the user device, and cannot be modified. Alternatively, the transmit power management conditions 1540 may be updated by modifying existing power management conditions, adding new power management conditions, or deleting existing power management conditions.

Returning to FIG. 15, in one embodiment, the transmit power manager 1500 includes a predicting module 1525 that predicts future transmit power levels that may be specified by a wireless communication system. These predictions may be used by the condition checking module 1530 to predict whether transmission power management conditions 1540 are likely to be violated in the future. Some transmission power management conditions 1540 may also incorporate such predicted transmit power levels. For example, violation of some power management conditions 1540 may be contingent upon particular transmit power level predictions. For example, if the user device determines that a maximum accumulated power output level will be reached in the near future, power throttling may begin for current transmissions to prevent such an occurrence.

In one embodiment, the power throttling module 1535 reduces a transmit power level used to transmit data to the wireless carrier system by reducing the specified transmit power level when one or more proximity test conditions 1542 have been violated. For example, the power throttling module 1535 can receive an indication from the condition checking module 1530 that any one of the proximity test conditions 1542 has been violated, and accordingly, reduce the transmit power level to be used for data transmission. The power throttling module 1535 may also reduce the transmit power level below a specified transmit power level incrementally by incrementally transitioning to lower power classes or by incrementally reducing the number of scheduled requests. In one embodiment, a suitable transmit power level is an output level that does not cause any of the transmission power management conditions to be violated. Alternatively, a suitable transmit power level may be a level that causes the transmission power management condition to stop being violated at some point in the future. For example, a suitable transmit power level may cause a trend towards eventual compliance with the violated transmission power management conditions 1540.

Alternatively, the power throttling module 1535 may compute or otherwise identify a suitable transmit power level, and reduce the current transmit power level to the suitable transmit power level in a single action using the appropriate power class or multi-slot class or by reducing the number of scheduled requests. For example, a transmit power management condition 1540 may specify that any one of the proximity test conditions is violated, the transmit power level should be reduced. Alternatively, the transmit power level may be adjusted incrementally until the current transmit power level is at a suitable level.

Power throttling module 1535 may also reduce a duty cycle for the transmissions (e.g., space out the transmissions over time). Therefore, the power throttling module may adjust both the transmit power levels used for transmission and the frequency of those transmissions.

In one embodiment, transmitting module 1515 transmits data to a wireless communication system or additional user device at either a specified transmit power level (e.g., as specified by the wireless communication system) or at a transmit power level determined by the power throttling module 1535. The transmitting module 1515 may transmit the data through one or more antennas included in the user device.

Method 1600, 1700, and 1800 (FIGS. 16, 17 and 18) may be performed by processing logic that may comprise hardware (e.g., circuitry, dedicated logic, programmable logic, microcode, etc.), software (such as instructions running on a processor), firmware or a combination thereof. In one embodiment, methods 1600, 1700, and 1800 are performed by proximity sensor 1008 of FIG. 10. In another embodiment, the methods 1600, 1700, and 1800 are performed by the user device 1205 of FIG. 12, the user device 1300 of FIG. 13. In another embodiment, the methods 1600, 1700, and 1800 are performed by the sensor circuitry 1335 of FIG. 13. In another embodiment, the methods 1600, 1700, and 1800 are performed by the proximity condition checker 1365 of the transmit power management 1360. Alternatively, other components of a computing system may perform some or all of the operations of the methods 1600, 1700, and 1800.

Figure 16:
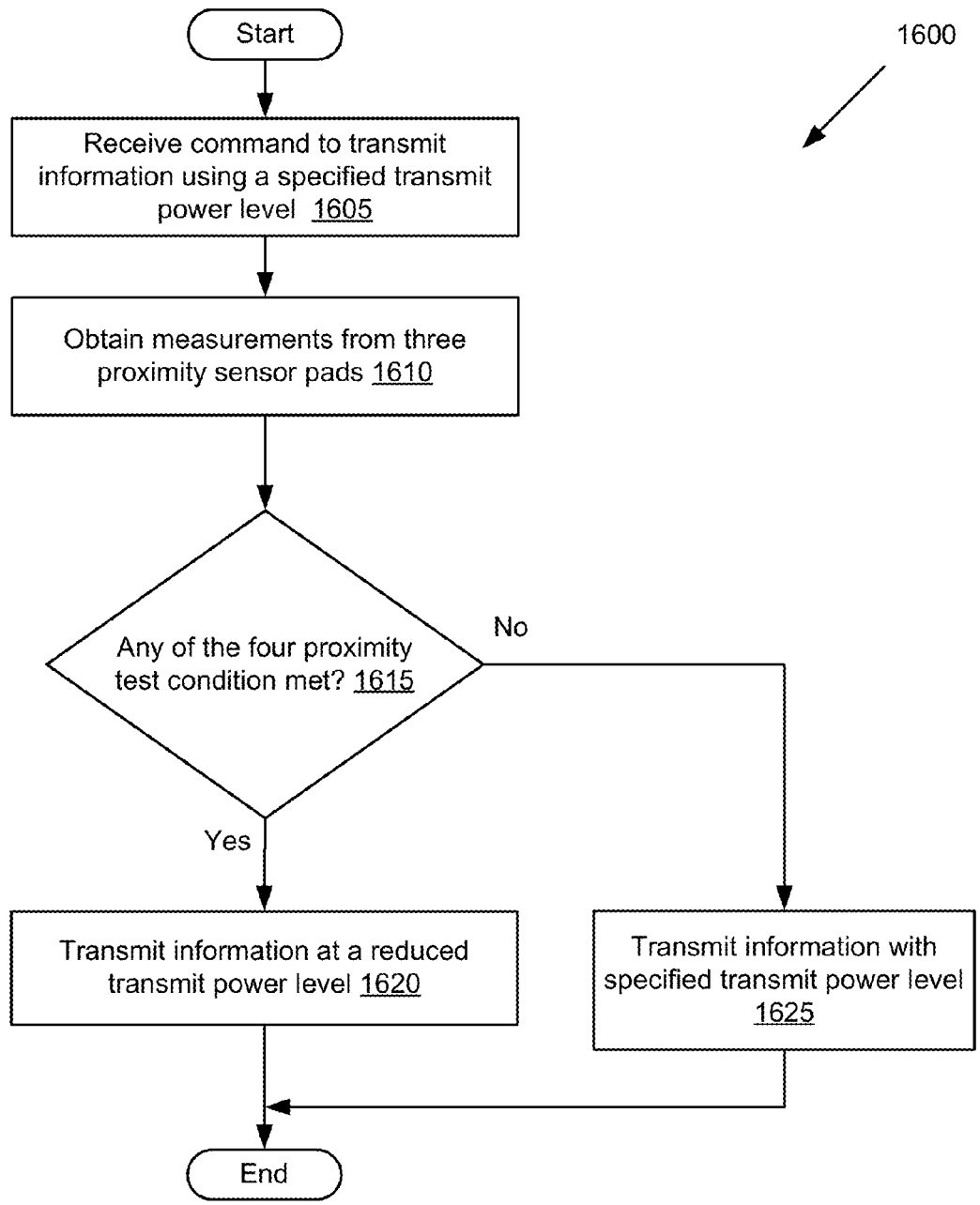
FIG. 16 is a flow diagram of an embodiment of a method for reducing a transmit power level when any one of four proximity test conditions is met.

FIG. 16 is a flow diagram of an embodiment of a method for reducing a transmit power level when any one of four proximity test conditions is met. At block 1605 of method 1600, a command is received to transmit data with a specified transmit power level by a user device. The command may be generated by the user device and the specified transmit power level can be directed by a wireless carrier, a Wi-Fi hotspot, or other wireless communications system. Alternatively, the command may be received from an application running on the user device (e.g., an application for creating a wireless ad hoc network). The user device obtains measurements from the three proximity sensor pads (block 1610). At block 1615, the user device determines whether any one of the four proximity test conditions is met. If no proximity test condition is met, the method 1600 proceeds to block 1625 to transmit information at the specified transmit power level. If any one of the proximity test conditions is met, the method 1600 proceeds to block 1620.

At block 1620, the user device reduces the transmit power level to a reduced transmit power level and transmits the data at the reduced transmit power level. The user device may additionally receive a command to transmit additional data using a different antenna than was used to transmit the original data. Such transmission of the additional data via the additional antenna may also be at a reduced transmit power level. The wireless carrier may specify the transmit power level, such as a maximum transmit power level and the user device may determine the transmit power level or the reduced transmit power level.

Figure 17:
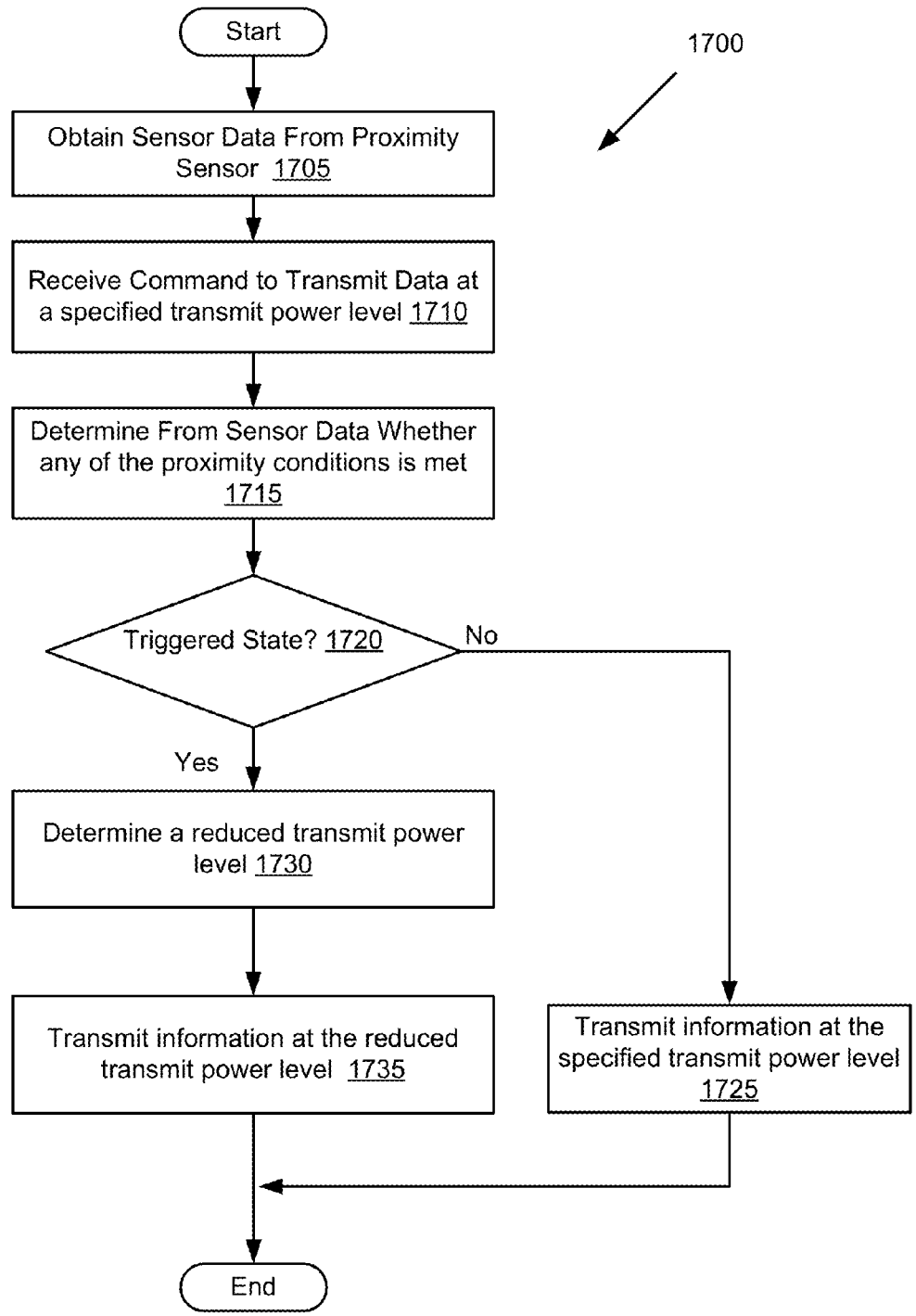
FIG. 17 is a flow diagram of another embodiment of a method for reducing a transmit power level when any one proximity test condition is met.

FIG. 17 is a flow diagram of another embodiment of a method for reducing a transmit power level when any one proximity test conditions is met. At block 1705 of method 1700, the user device receives sensor data from three or more proximity sensor pads included in a user device to detect an object. The object may be a portion of a human body part or phantom. At block 1710, the user device receives a command to transmit data at a specified transmit power level. At block 1715, the user device determines from the sensor data whether any one of the three or more proximity conditions is met. At block 1710, the user device determines if the user device is in a triggered state when any one of the three or more proximity test conditions is met. When the user device is in a triggered state, the method proceeds to block 1730 to determine a reduced transmit power level and then to block 1735 to transmit information at the reduced transmit power level. However, if the user device is not in a triggered state at block 1720, the method proceeds to block 1725 to transmit the data at the specified transmit power level.

Figure 18:
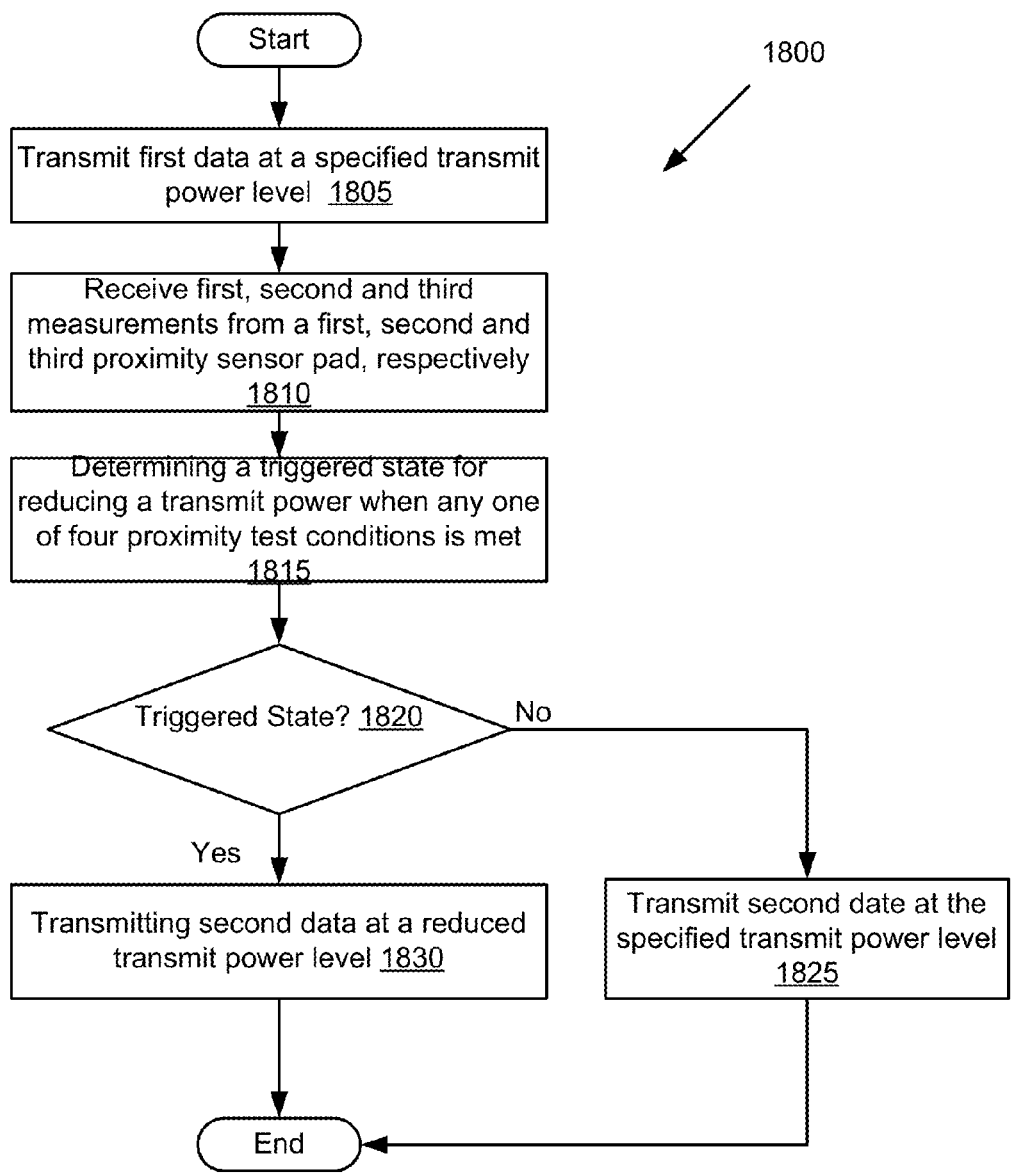
FIG. 18 is a flow diagram of an embodiment of a method for determining a triggered state for SAR compliance.

FIG. 18 is a flow diagram of an embodiment of a method for determining a triggered state for SAR compliance. The method 1800 begins by the processing logic transmitting first data at a specified transmit power level using an antenna of the user device (block 1805). The processing logic receive a first measurement, a second measurement and a third measurement from a first proximity sensor pad, a second proximity sensor pad and a third proximity sensor pad, respectively (block 1810). The first measurement is indicative of a first distance between the first proximity sensor pad and an object, the second measurement is indicative of a second distance between the second proximity sensor page and the object and the third measurement is indicative of a third distance between the second proximity sensor page and the object. The processing logic determines a triggered state for reducing a transmit power of the antenna when any one of four proximity test conditions is met using the first measurement, second measurement and third measurement (block 1820). The four proximity test conditions are independently defined by different combinations of thresholds for the first measurement, second measurement and third measurement. In response to the triggered state at block 1820, the processing logic transmits second data at a reduced transmit power level. However, if in an untriggered state at block 1820, the processing logic transmits the second data at the specified transmit power level (block 1825), and the method 1800 ends. Alternatively, the method can return to block 1810 to receive additional measurements and repeat.

In one embodiment, the four proximity test conditions each indicate a condition in which a presence of an object that absorbs electromagnetic radiation is proximate to the user device. In another embodiment, the processing logic calculates the reduced transmit power level based on the first measurement, second measurement and third measurement and in response to the triggered state.

In a further embodiment, the processing logic sets seven distance thresholds for the different combinations of distance thresholds. In this embodiment, the processing logic determines the triggered state as follows: The processing logic 1) determines whether a first proximity test condition is met, the first proximity test condition being met when a first measurement from the first proximity sensor pad exceeds a first threshold, a second measurement from the second proximity sensor pad exceeds a second threshold, a ratio of the second measurement and the first measurement is less than a third threshold and a third measurement from the third proximity sensor pad is greater than one (representing a "don't care" input); 2) determines whether a second proximity test condition is met, the second proximity test condition being met when the first measurement is greater than one (representing a "don't care" input), the second measurement is greater than a fourth threshold, the third measurement is greater than one (representing a "don't care" input) and the ratio is greater than the third threshold; 3) determines whether a third proximity test condition and a fourth proximity test condition are met for a first side, the third proximity test condition and fourth proximity test condition being met when the second measurement is less than a fifth threshold and the first measurement is greater than a sixth threshold; and 4) determines whether the third proximity test condition and fourth proximity test condition are met for a second side, the third proximity test condition and fourth proximity test condition being met when the second measurement is less than the fifth threshold and the third measurement is greater than a seventh threshold.

In one embodiment, the first condition is detected when an object is within a first distance from a top edge of the user device and the second condition is detected when the object is within a second distance from a non-display side of the user device. The third condition is detected before the first end or second end of the antenna overlaps with the object when the top edge of the user device is perpendicular to a bottom side of the object and moved along an axis parallel to the phantom with a first constant distance towards the object, the first constant distance being the first distance d1. The fourth condition is detected before the first end or the second end of the antenna overlaps with the object when the non-display side of the user device is parallel to the bottom side of the object and moved along an axis parallel to the phantom with a second constant distance towards the object, the second constant distance being the second distance d2. The object is at least one of a human body part or a phantom.

In another embodiment, the processing logic obtains measurements from multiple proximity electrodes. A first one of the proximity electrodes is located at or beyond a first end of an antenna, a second one of the proximity electrodes is located at a center location on a side of the antenna and a third one of the proximity electrodes is located at or beyond a second end of the antenna. The processing logic determines whether any one of three or more proximity test conditions is met using the measurements. The three or more proximity test conditions are independently defined by different combinations of distance thresholds. The processing logic instructs a transmit power manager to reduce a transmit power level to be used by the antenna to transmit data when any one of the three or more proximity test conditions is met. In one embodiment, the three or more proximity test conditions each indicates a condition in which a presence of an object that absorbs electromagnetic radiation is proximate to the user device, the object being at least one of a human body part or a phantom.

In a further embodiment, the processing logic calculates calculating a reduced transmit power level based on the measurements, and instructs the transmit manger to reduce the transmit power level to the reduced transmit power level.

In another embodiment, the processing logic checks the four proximity test conditions described above.

In another embodiment, the processing logic is coupled to a processor that executes a transmit power manager. In this embodiment, the processing logic sends a signal to the processor to instruct the transmit power manager to reduce the transmit power level.

In another embodiment, the processing logic is implemented in a proximity sensor chip that is coupled to the three or more proximity sensor pads. The processing logic performs a self-calibration of the proximity electrodes to obtain the baseline measurements. The processing logic compares the measurements from the proximity electrodes against baseline measurements for the proximity electrodes respectively. The proximity sensor chip outputs a signal indicating that the proximity sensor is in a triggered state when any one of the three or more proximity test conditions is met. The proximity sensor chip changes the signal to indicate that the proximity sensor is in an untriggered state when none of the three or more proximity test conditions is met. In another embodiment, the proximity sensor chip can send a separate signal when the proximity sensor is in an untriggered state. In one embodiment, the processing logic can perform a calibration when the proximity sensor switches from the triggered state to the untriggered state.

In the above description, numerous details are set forth. It will be apparent, however, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A method, implemented by a user device programmed to perform the following, the method comprising:
   transmitting first data at a specified transmit power level using an antenna of the user device;
   receiving a first measurement from a first proximity sensor pad, wherein the first measurement is indicative of a first distance between the first proximity sensor pad and an object;
   receiving a second measurement from a second proximity sensor pad, wherein the second measurement is indicative of a second distance between the second proximity sensor pad and the object;
   receiving a third measurement from a third proximity sensor pad, wherein the third measurement is indicative of a third distance between the second proximity sensor pad and the object, wherein the first proximity sensor pad is located adjacent to a first end of the antenna, the second proximity sensor pad is located at an approximate center location of the antenna and adjacent to a longitudinal side of the antenna and the third proximity sensor pad is located adjacent to a second end of the antenna;
   determining a triggered state for reducing the specified transmit power level to a reduced transmit power level used by the antenna when any one of four proximity test conditions is met using the first measurement, second measurement and third measurement, wherein the four proximity test conditions are—defined by different combinations of distance thresholds for the first measurement, second measurement and third measurement, wherein the different combination of distance thresholds define distances of the object relative to the antenna, wherein at least one of the four proximity test conditions is met when the first measurement exceeds a first threshold and a ratio of the second measurement and the first measurement is less than a third threshold; and
   in response to the triggered state, transmitting second data at the reduced transmit power level.

2. The method of claim 1, wherein the four proximity test conditions each indicates a condition in which a presence of the object that absorbs electromagnetic radiation is proximate to the user device.

3. The method of claim 1, wherein the reduced transmit power level is a predefined power level that is less than the specified transmit power level.

4. The method of claim 1, further comprising setting seven distance thresholds for the different combinations of distance thresholds, and wherein the determining the triggered state comprises:
   determining whether a first proximity test condition is met, wherein the first proximity test condition is met when a first measurement from the first proximity sensor pad exceeds a first threshold, a second measurement from the second proximity sensor pad exceeds a second threshold, and a ratio of the second measurement and the first measurement is less than a third threshold;

determining whether a second proximity test condition is met, wherein the second proximity test condition is met when the second measurement is greater than a fourth threshold, and the ratio is greater than the third threshold;

determining whether a third proximity test condition and a fourth proximity test condition are met for a first side, wherein the third proximity test condition and fourth proximity test condition are met when the second measurement is less than a fifth threshold and the first measurement is greater than a sixth threshold; and determining whether the third proximity test condition and fourth proximity test condition are for a second side, wherein the third proximity test condition and fourth proximity test condition are met when the second measurement is less than the fifth threshold and a third measurement from the third proximity sensor pad is greater than a seventh threshold.

5. A non-transitory computer readable storage medium storing instruction that when executed by a processing device cause the processing device to perform operations comprising:

obtaining measurements from a plurality of proximity electrodes, wherein the measurements are indicative of distances between an object and the plurality of proximity electrodes;

determining whether any one of three or more proximity test conditions is met using the measurements, wherein the three or more proximity test conditions are defined by different combinations of distance thresholds; and instructing a transmit power manager to reduce a transmit power level to be used by the antenna to transmit data when any one of the three or more proximity test conditions is met.

6. The non-transitory computer readable storage medium of claim 5, wherein the three or more proximity test conditions each indicates a condition in which a presence of the object that absorbs electromagnetic radiation is proximate to the user device, wherein the object is at least one of a human body part or a phantom.

7. The non-transitory computer readable storage medium of claim 5, wherein the operations further comprise calculating a reduced transmit power level based on the measurements, and wherein instructing the transmit power manager to reduce the transmit power level comprises instructing the transmit manger to reduce the transmit power level to the reduced transmit power level.

8. The non-transitory computer readable storage medium of claim 5, wherein the three or more proximity test conditions comprise four proximity test conditions, wherein the operations further comprises setting seven distance thresholds for the different combinations of distance thresholds, and wherein the determining whether any one of three or more proximity test conditions is met comprises:

determining whether a first proximity test condition is met, wherein the first proximity test condition is met when a first measurement from the first one of the plurality of proximity electrodes exceeds a first threshold, a second measurement from the second one of the plurality of proximity electrodes exceeds a second threshold, and a ratio of the second measurement and the first measurement is less than a third threshold;

determining whether a second proximity test condition is met, wherein the second proximity test condition is met when the second measurement is greater than a fourth threshold, and the ratio is greater than the third threshold;

determining whether a third proximity test condition and a fourth proximity test condition are met for a first side, wherein the third proximity test condition and fourth proximity test condition are met when the second measurement is less than a fifth threshold and the first measurement is greater than a sixth threshold; and determining whether the third proximity test condition and fourth proximity test condition are met for a second side, wherein the third proximity test condition and fourth proximity test condition are met when the second measurement is less than the fifth threshold and a third measurement from the third one of the plurality of proximity electrodes is greater than a seventh threshold.

9. The non-transitory computer readable storage medium of claim 8, wherein the first condition is detected when the object is within a first distance from a first edge of a user device comprising the processing device; wherein the second condition is detected when the object is within a second distance from a non-display side of the user device, wherein the third condition is detected before the first end or second end of the antenna overlaps with the object when the first edge of the user device is perpendicular to a first side of the object and moved along a first axis parallel to the object with a first constant distance towards the object, wherein the first constant distance is the first distance, wherein the fourth condition is detected before the first end or the second end of the antenna overlaps with the object when the non-display side of the user device is parallel to a bottom side of the object and moved along a second axis parallel to the object with a second constant distance towards the object, wherein the second constant distance is the second distance, and wherein the object is at least one of a human body part of a phantom.

10. The non-transitory computer readable storage medium of claim 5, wherein instructing the transmit power manager comprises sending, by the processing device, a signal to the transmit power manager to reduce the transmit power level used by the antenna.

11. The non-transitory computer readable storage medium of claim 5, wherein instructing the transmit power manager comprises:

outputting, by a proximity sensor, a signal indicating that the proximity sensor is in a triggered state when any one of the three or more proximity test conditions is met;

receiving, by the processing device, the signal; and communicating, by the processing device, with the transmit power manager to reduce the transmit power level to be used by the antenna, wherein the proximity sensor is in the triggered state until none of the three or more proximity test conditions is met.

12. The non-transitory computer readable storage medium of claim 11, wherein the operations further comprise performing a calibration of the proximity sensor when the proximity sensor switches from the triggered state to an untriggered state.

13. The non-transitory computer readable storage medium of claim 5, wherein the determining comprises comparing the measurements from the plurality of proximity electrodes against baseline measurements for the plurality of proximity electrodes respectively.

14. The non-transitory computer readable storage medium of claim 13, wherein the operations further comprise performing a self-calibration of a proximity sensor for each of the plurality of proximity electrodes to obtain the baseline measurements for the plurality of proximity electrodes.

15. A user device comprising:
an antenna;
a plurality of proximity electrodes, wherein a first one of the plurality of proximity electrodes is located at or beyond a first end of the antenna, a second one of the plurality of proximity electrodes is located at a center location on a side of the antenna and a third one of the plurality of proximity electrodes is located at or beyond a second end of the antenna;
a transceiver to transmit data via the antenna according to a transmit power level; and
a proximity sensor coupled to the transceiver and the plurality of proximity electrodes, wherein the proximity sensor is configured to:
obtain measurements of the plurality of proximity electrodes, wherein the measurements are indicative of distances between an object and the plurality of proximity electrodes;
determine whether any one of three or more proximity test conditions is met using the measurements, wherein the three or more proximity test conditions are defined by different combinations of distance thresholds; and
instruct the transceiver to reduce the transmit power level to transmit the data when any one of the three or more proximity test conditions is met.

16. The user device of claim 15, further comprising a processing component coupled to the proximity sensor and the transceiver, wherein the proximity sensor outputs a signal to a transmit power manager executing on the processing component when any of the three or more proximity tests conditions is met, wherein the transmit power manager instructs the transceiver to reduce the transmit power level.

17. The user device of claim 16, wherein the processing component and the proximity sensor are implemented in a same integrated circuit.

18. The user device of claim 15, wherein the different combinations of distance thresholds comprises seven distance thresholds, wherein the three or more proximity test conditions comprise four proximity test conditions, and wherein the proximity sensor is further configured to:
determine whether a first proximity test condition is met, wherein the first proximity test condition is met when a first measurement from the first one of the plurality of proximity electrodes exceeds a first threshold, a second measurement from the second one of the plurality of proximity electrodes exceeds a second threshold, and a ratio of the second measurement and the first measurement is less than a third threshold;
determine whether a second proximity test condition is met, wherein the second proximity test condition is met when the second measurement is greater than a fourth threshold, and the ratio is greater than the third threshold;
determine whether a third proximity test condition and a fourth proximity test condition are met for a first side, wherein the third proximity test condition and fourth proximity test condition are met for the first side when the second measurement is less than a fifth threshold and the first measurement is greater than a sixth threshold; and
determine whether the third proximity test condition and fourth proximity test condition are met for a second side, wherein the third proximity test condition and fourth proximity test condition are met for the second side when the second measurement is less than the fifth threshold and a third measurement from the third one of the plurality of proximity electrodes is greater than a seventh threshold.

19. The user device of claim 18, wherein the first condition is detected when the object is within a first distance from a first edge of the user device; wherein the second condition is detected when the object is within a second distance from a non-display side of the user device, wherein the third condition is detected before the first end or second end of the antenna overlaps with the object when the first edge of the user device is perpendicular to a first side of the object and moved along a first axis parallel to the object with a first constant distance towards the object, wherein the first constant distance is the first distance, wherein the fourth condition is detected before the first end or the second end of the antenna overlaps with the object when the non-display side of the user device is parallel to a bottom side of the object and moved along a second axis parallel to the object with a second constant distance towards the object, wherein the second constant distance is the second distance, and wherein the object is at least one of a human body part or a phantom.

20. The user device of claim 15, further comprising a processor coupled to the proximity sensor, wherein the proximity sensor outputs a signal indicating the proximity sensor is in a triggered state when any one of the three or more proximity test conditions is met, wherein the processor receives the signal from the proximity sensor and communication with the transmit power manage to reduce the transmit power level to be used by the antenna, and wherein the proximity sensor is in the triggered state until none of the three or more proximity test conditions is met.

* * * * *